US012585945B2

(12) United States Patent
Ni et al.

(10) Patent No.: US 12,585,945 B2
(45) Date of Patent: Mar. 24, 2026

(54) PARAMETER OPTIMIZATION METHOD, ELECTRONIC DEVICE, AND STORAGE MEDIUM

(71) Applicant: HUAWEI TECHNOLOGIES CO., LTD., Shenzhen (CN)

(72) Inventors: Ningxi Ni, Hangzhou (CN); Min Wang, Hangzhou (CN); Zidong Wang, Hangzhou (CN); Fan Yu, Hangzhou (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 677 days.

(21) Appl. No.: 18/071,277

(22) Filed: Nov. 29, 2022

(65) Prior Publication Data

US 2023/0087774 A1     Mar. 23, 2023

Related U.S. Application Data

(63) Continuation of application No. PCT/CN2021/091753, filed on Apr. 30, 2021.

(30) Foreign Application Priority Data

May 30, 2020     (CN) .......................... 202010480676.0

(51) Int. Cl.
*G06N 3/08*          (2023.01)
(52) U.S. Cl.
CPC ..................................... *G06N 3/08* (2013.01)
(58) Field of Classification Search
CPC ........................................................ G06N 3/08
See application file for complete search history.

(56) References Cited

U.S. PATENT DOCUMENTS

| | | | | |
|---|---|---|---|---|
| 11,983,635 B1 * | 5/2024 | Mehouachi | ............ | G06N 3/084 |
| 12,347,111 B2 * | 7/2025 | Paik | .......................... | G06T 7/11 |

(Continued)

FOREIGN PATENT DOCUMENTS

| | | | | | |
|---|---|---|---|---|---|
| CN | 116681127 B | * | 11/2023 | ............. | G06N 3/098 |
| CN | 116644804 B | * | 1/2024 | ............. | G06N 3/098 |

OTHER PUBLICATIONS

Shiliang Sun et al. "A Survey of Optimization Methods from a Machine Learning Perspective", School of Computer Science and Technology, East China Normal University, Shanghai, P.R. China, Oct. 23, 2019, 30 pages. (Year: 2019).*

(Continued)

*Primary Examiner* — G. C. Neurauter, Jr.
(74) *Attorney, Agent, or Firm* — Fish & Richardson P.C.

(57) ABSTRACT

Example parameter optimization methods and apparatus are described. In one example parameter optimization method, a data processing device obtains a Kronecker factor matrix that is used to indicate a higher-order information matrix of a neural network model, and segments the Kronecker factor matrix to obtain a plurality of square matrices. The obtained plurality of square matrices are submatrices of the Kronecker factor matrix, and main diagonal lines of the plurality of square matrices each are in a one-to-one correspondence with a part of a main diagonal line of the Kronecker factor matrix. Then, the data processing device adjusts a parameter of the neural network model based on the obtained plurality of square matrices.

20 Claims, 12 Drawing Sheets

700A 720-1

710

720-2

720-3

(56)                    References Cited

U.S. PATENT DOCUMENTS

| 12,367,387 B2 * | 7/2025 | Saxton | G06N 3/08 |
| 2014/0067738 A1 | 3/2014 | Kingsbury | |
| 2018/0107925 A1 | 4/2018 | Choi et al. | |
| 2021/0357740 A1 * | 11/2021 | He | G06N 3/02 |

OTHER PUBLICATIONS

Kazuki Osawa et al. "Large-Scale Distributed Second-Order Optimization Using Kronecker-Factored Approximate Curvature for Deep Convolutional Neural Networks", 2019 IEEE/CVF Conference on Computer Vision and Pattern Recognition (CVPR) , p. 12351-9, 9 pages. (Year: 2019).*

Jimmy Ba et al. "Distributed Second-Order Optimization Using Kronecker-Factored Approximations", Published as a conference paper at ICLR 2017, 17 pages. (Year: 2017).*

Roger Grosse and James Martens. "A Kronecker-factored approximate Fisher matrix for convolution layers", May 23, 2016, 34 pages. (Year: 2016).*

\* cited by examiner

235

700A

710

720-1

720-2

720-3

| | $Y_0$ | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ |
|---|---|---|---|---|---|---|---|---|---|---|---|---|
| $X_0$ | $X_0Y_0$ | $X_0Y_1$ | $X_0Y_2$ | $X_0Y_3$ | $X_0Y_4$ | $X_0Y_5$ | $X_0Y_6$ | $X_0Y_7$ | $X_0Y_8$ | $X_0Y_9$ | $X_0Y_{10}$ | $X_0Y_{11}$ |
| $X_1$ | $X_1Y_0$ | $X_1Y_1$ | $X_1Y_2$ | $X_1Y_3$ | $X_1Y_4$ | $X_1Y_5$ | $X_1Y_6$ | $X_1Y_7$ | $X_1Y_8$ | $X_1Y_9$ | $X_1Y_{10}$ | $X_1Y_{11}$ |
| $X_2$ | $X_2Y_0$ | $X_2Y_1$ | $X_2Y_2$ | $X_2Y_3$ | $X_2Y_4$ | $X_2Y_5$ | $X_2Y_6$ | $X_2Y_7$ | $X_2Y_8$ | $X_2Y_9$ | $X_2Y_{10}$ | $X_2Y_{11}$ |
| $X_3$ | $X_3Y_0$ | $X_3Y_1$ | $X_3Y_2$ | $X_3Y_3$ | $X_3Y_4$ | $X_3Y_5$ | $X_3Y_6$ | $X_3Y_7$ | $X_3Y_8$ | $X_3Y_9$ | $X_3Y_{10}$ | $X_3Y_{11}$ |
| $X_4$ | $X_4Y_0$ | $X_4Y_1$ | $X_4Y_2$ | $X_4Y_3$ | $X_4Y_4$ | $X_4Y_5$ | $X_4Y_6$ | $X_4Y_7$ | $X_4Y_8$ | $X_4Y_9$ | $X_4Y_{10}$ | $X_4Y_{11}$ |
| $X_5$ | $X_5Y_0$ | $X_5Y_1$ | $X_5Y_2$ | $X_5Y_3$ | $X_5Y_4$ | $X_5Y_5$ | $X_5Y_6$ | $X_5Y_7$ | $X_5Y_8$ | $X_5Y_9$ | $X_5Y_{10}$ | $X_5Y_{11}$ |
| $X_6$ | $X_6Y_0$ | $X_6Y_1$ | $X_6Y_2$ | $X_6Y_3$ | $X_6Y_4$ | $X_6Y_5$ | $X_6Y_6$ | $X_6Y_7$ | $X_6Y_8$ | $X_6Y_9$ | $X_6Y_{10}$ | $X_6Y_{11}$ |
| $X_7$ | $X_7Y_0$ | $X_7Y_1$ | $X_7Y_2$ | $X_7Y_3$ | $X_7Y_4$ | $X_7Y_5$ | $X_7Y_6$ | $X_7Y_7$ | $X_7Y_8$ | $X_7Y_9$ | $X_7Y_{10}$ | $X_7Y_{11}$ |
| $X_8$ | $X_8Y_0$ | $X_8Y_1$ | $X_8Y_2$ | $X_8Y_3$ | $X_8Y_4$ | $X_8Y_5$ | $X_8Y_6$ | $X_8Y_7$ | $X_8Y_8$ | $X_8Y_9$ | $X_8Y_{10}$ | $X_8Y_{11}$ |
| $X_9$ | $X_9Y_0$ | $X_9Y_1$ | $X_9Y_2$ | $X_9Y_3$ | $X_9Y_4$ | $X_9Y_5$ | $X_9Y_6$ | $X_9Y_7$ | $X_9Y_8$ | $X_9Y_9$ | $X_9Y_{10}$ | $X_9Y_{11}$ |
| $X_{10}$ | $X_{10}Y_0$ | $X_{10}Y_1$ | $X_{10}Y_2$ | $X_{10}Y_3$ | $X_{10}Y_4$ | $X_{10}Y_5$ | $X_{10}Y_6$ | $X_{10}Y_7$ | $X_{10}Y_8$ | $X_{10}Y_9$ | $X_{10}Y_{10}$ | $X_{10}Y_{11}$ |
| $X_{11}$ | $X_{11}Y_0$ | $X_{11}Y_1$ | $X_{11}Y_2$ | $X_{11}Y_3$ | $X_{11}Y_4$ | $X_{11}Y_5$ | $X_{11}Y_6$ | $X_{11}Y_7$ | $X_{11}Y_8$ | $X_{11}Y_9$ | $X_{11}Y_{10}$ | $X_{11}Y_{11}$ |

| | $Y_0$ | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ |
|---|---|---|---|---|---|---|---|---|---|---|---|---|
| $X_0$ | $X_0Y_0$ | $X_0Y_1$ | $X_0Y_2$ | $X_0Y_3$ | $X_0Y_4$ | $X_0Y_5$ | $X_0Y_6$ | $X_0Y_7$ | $X_0Y_8$ | $X_0Y_9$ | $X_0Y_{10}$ | $X_0Y_{11}$ |
| $X_1$ | $X_1Y_0$ | $X_1Y_1$ | $X_1Y_2$ | $X_1Y_3$ | $X_1Y_4$ | $X_1Y_5$ | $X_1Y_6$ | $X_1Y_7$ | $X_1Y_8$ | $X_1Y_9$ | $X_1Y_{10}$ | $X_1Y_{11}$ |
| $X_2$ | $X_2Y_0$ | $X_2Y_1$ | $X_2Y_2$ | $X_2Y_3$ | $X_2Y_4$ | $X_2Y_5$ | $X_2Y_6$ | $X_2Y_7$ | $X_2Y_8$ | $X_2Y_9$ | $X_2Y_{10}$ | $X_2Y_{11}$ |
| $X_3$ | $X_3Y_0$ | $X_3Y_1$ | $X_3Y_2$ | $X_3Y_3$ | $X_3Y_4$ | $X_3Y_5$ | $X_3Y_6$ | $X_3Y_7$ | $X_3Y_8$ | $X_3Y_9$ | $X_3Y_{10}$ | $X_3Y_{11}$ |
| $X_4$ | $X_4Y_0$ | $X_4Y_1$ | $X_4Y_2$ | $X_4Y_3$ | $X_4Y_4$ | $X_4Y_5$ | $X_4Y_6$ | $X_4Y_7$ | $X_4Y_8$ | $X_4Y_9$ | $X_4Y_{10}$ | $X_4Y_{11}$ |
| $X_5$ | $X_5Y_0$ | $X_5Y_1$ | $X_5Y_2$ | $X_5Y_3$ | $X_5Y_4$ | $X_5Y_5$ | $X_5Y_6$ | $X_5Y_7$ | $X_5Y_8$ | $X_5Y_9$ | $X_5Y_{10}$ | $X_5Y_{11}$ |
| $X_6$ | $X_6Y_0$ | $X_6Y_1$ | $X_6Y_2$ | $X_6Y_3$ | $X_6Y_4$ | $X_6Y_5$ | $X_6Y_6$ | $X_6Y_7$ | $X_6Y_8$ | $X_6Y_9$ | $X_6Y_{10}$ | $X_6Y_{11}$ |
| $X_7$ | $X_7Y_0$ | $X_7Y_1$ | $X_7Y_2$ | $X_7Y_3$ | $X_7Y_4$ | $X_7Y_5$ | $X_7Y_6$ | $X_7Y_7$ | $X_7Y_8$ | $X_7Y_9$ | $X_7Y_{10}$ | $X_7Y_{11}$ |
| $X_8$ | $X_8Y_0$ | $X_8Y_1$ | $X_8Y_2$ | $X_8Y_3$ | $X_8Y_4$ | $X_8Y_5$ | $X_8Y_6$ | $X_8Y_7$ | $X_8Y_8$ | $X_8Y_9$ | $X_8Y_{10}$ | $X_8Y_{11}$ |
| $X_9$ | $X_9Y_0$ | $X_9Y_1$ | $X_9Y_2$ | $X_9Y_3$ | $X_9Y_4$ | $X_9Y_5$ | $X_9Y_6$ | $X_9Y_7$ | $X_9Y_8$ | $X_9Y_9$ | $X_9Y_{10}$ | $X_9Y_{11}$ |
| $X_{10}$ | $X_{10}Y_0$ | $X_{10}Y_1$ | $X_{10}Y_2$ | $X_{10}Y_3$ | $X_{10}Y_4$ | $X_{10}Y_5$ | $X_{10}Y_6$ | $X_{10}Y_7$ | $X_{10}Y_8$ | $X_{10}Y_9$ | $X_{10}Y_{10}$ | $X_{10}Y_{11}$ |
| $X_{11}$ | $X_{11}Y_0$ | $X_{11}Y_1$ | $X_{11}Y_2$ | $X_{11}Y_3$ | $X_{11}Y_4$ | $X_{11}Y_5$ | $X_{11}Y_6$ | $X_{11}Y_7$ | $X_{11}Y_8$ | $X_{11}Y_9$ | $X_{11}Y_{10}$ | $X_{11}Y_{11}$ |

Obtain Kronecker factor matrices used to indicate a higher-order information matrix of a neural network model

1004

Segment the Kronecker factor matrix to obtain a plurality of square matrices

1006

Adjust a parameter of a neural network model based on the plurality of square matrices

1100

1110

Obtaining unit

1120

Segmentation unit

1130

Adjustment unit

PARAMETER OPTIMIZATION METHOD, ELECTRONIC DEVICE, AND STORAGE MEDIUM

CROSS-REFERENCE TO RELATED APPLICATIONS

This application is a continuation of International Application No. PCT/CN2021/091753, filed on Apr. 30, 2021, which claims priority to Chinese Patent Application No. 202010480676.0, filed on May 30, 2020. The disclosures of the aforementioned applications are hereby incorporated by reference in their entireties.

TECHNICAL FIELD

Embodiments of the present application mainly relate to the field of computer technologies, and more specifically, to a parameter optimization method and apparatus, an electronic device, and a computer-readable storage medium.

BACKGROUND

With continuous development of computer technologies, deep learning technologies have been applied to various fields. Currently, deep learning shows excellent performance in many application fields such as image recognition, target detection, and natural language processing.

Training of a deep learning model becomes a focus of current attention. Common optimization algorithms for deep learning models include a first-order optimization algorithm (for example, a gradient descent algorithm) and a higher-order optimization algorithm (for example, a natural gradient algorithm). A convergence speed of first-order optimization is low. Compared with the first-order optimization algorithm, the higher-order optimization algorithm can usually provide better training precision, but requires higher time costs.

SUMMARY

Embodiments of the present application provide a parameter optimization solution.

According to a first aspect of the present application, a method applied to a data processing device is provided. The method includes: obtaining Kronecker factor matrices that are used to indicate a higher-order information matrix of a neural network model, where the higher-order information matrix is used to correct a first-order gradient of the neural network model; segmenting the Kronecker factor matrix to obtain a plurality of square matrices, so that the plurality of square matrices are submatrices of the Kronecker factor matrix, and main diagonal lines of the plurality of square matrices each are in a one-to-one correspondence with a part of a main diagonal line of the Kronecker factor matrix; and adjusting a parameter of the neural network model based on the plurality of square matrices.

In the present application, the higher-order information matrix is a matrix that is generated in a training process of the neural network model and that is used to correct a first-order derivative of the model, for example, a Hessian matrix, a Fisher matrix, or a second-order moment matrix. The Kronecker factor matrices are a pair of matrices obtained by performing Kronecker decomposition on the higher-order information matrix, and a Kronecker product of the pair of matrices is equal to the higher-order information matrix.

In the present application, segmentation may be performed along the main diagonal line of the Kronecker factor matrix based on a predetermined segmentation dimension, to obtain the plurality of square matrices whose ranks are equal to the segmentation dimension. In some cases, when a rank of the Kronecker factor matrix can be exactly divided by the segmentation dimension, a Kronecker factor is segmented into an integral quantity of square matrices with a same rank. In some other cases, when the rank of the Kronecker factor matrix cannot be exactly divided by the segmentation dimension, the Kronecker factor is segmented into an integral quantity of square matrices with a same rank and one or more square matrices whose ranks are less than the segmentation dimension.

Based on such segmentation, the main diagonal lines of the plurality of square matrices each are in a one-to-one correspondence with a part of the main diagonal line of the Kronecker factor matrix, that is, elements on all the main diagonal lines of the plurality of square matrices include all elements on the main diagonal line of the Kronecker factor matrix. In addition, a square matrix whose rank is greater than 1 in the plurality of square matrices also includes other elements in the Kronecker factor matrix, and these elements are elements that are close to the main diagonal line of the Kronecker factor matrix.

In addition, the data processing device in the present application is a device that has an AI data computing capability, and may be a terminal device or a network device.

In such a manner, in this embodiment of the present application, the Kronecker factor matrix is converted into an approximation of the plurality of small square matrices, thereby greatly reducing time complexity of operation, and reducing time costs of model training.

In some implementations of the first aspect, the data processing device includes a computing resource used to perform the adjustment, and the segmenting the Kronecker factor matrix includes: segmenting the Kronecker factor matrix based on a resource identifier of the computing resource and a model identifier of the neural network model.

In some embodiments, the model identifier may be identification information indicating a type of the neural network model, for example, "resnet50" may indicate that the neural network model is a 50-layer deep residual network (ResNet). Examples of the model identifier may further include "resnet18", "resnet101", "VGG16", "LeNet5", and the like. In addition, the resource identifier may be identification information indicating a model number of the computing resource, for example, a chip name, a chip code, a chip type number, or even an identifier of a device in which a chip is located may be used as the resource identifier. For example, the resource identifier may be a specific model number of an AI chip configured to train the neural network model, for example, "GPU V100". Alternatively, the resource identifier may be a unique identifier of the computing resource, for example, a MAC address of the computing resource.

In some embodiments, the segmentation dimension used for segmenting the Kronecker factor matrix may be determined based on the resource identifier and the model identifier, and the Kronecker factor is segmented based on the segmentation dimension. For example, a corresponding historical optimization policy may be queried based on the resource identifier and the model identifier, to determine the segmentation dimension used for segmenting the Kronecker factor matrix. Based on such a manner, in this embodiment of the present application, how to segment the Kronecker factor matrix can be quickly determined according to the historical optimization policy corresponding to the model and the computing resource, thereby further reducing computing costs.

In some implementations of the first aspect, the data processing device stores a correspondence among the resource identifier, the model identifier, and a dimension, and the dimension indicates a rank of at least one of the plurality of square matrices obtained by segmenting the Kronecker factor matrix.

In some embodiments, the correspondence among the resource identifier, the model identifier, and the dimension may be stored, for example, in a configuration file. The correspondence may be a correspondence among the resource identifier, the model identifier, and the dimension, or may be a correspondence between two of the resource identifier, the model identifier, and the dimension. In this embodiment of the present application, the correspondence among the resource identifier, the model identifier, and the dimension is maintained, to quickly implement a search based on the resource identifier and the model identifier, thereby efficiently determining an available optimization policy from the historical optimization policy.

In some implementations of the first aspect, the data processing device includes a computing resource used to perform the adjustment, and the segmenting the Kronecker factor matrix includes: selecting a target dimension from a plurality of dimensions based on performance information corresponding to the plurality of dimensions to segment the Kronecker factor matrix, where performance information corresponding to one dimension indicates efficiency of the computing resource in processing a square matrix corresponding to the dimension, and the target dimension indicates a rank of at least one of the plurality of square matrices obtained by segmenting the Kronecker factor matrix.

In this application, the target dimension may be selected based on the performance information corresponding to the plurality of dimensions, and the Kronecker factor matrix is segmented based on the target dimension. For example, the plurality of dimensions may be a group of preset candidate dimensions. A group of sample square matrices corresponding to the group of candidate dimensions may be constructed, and performance information corresponding to different dimensions is determined by obtaining efficiency of the computing resource in processing these sample square matrices.

In some embodiments, corresponding performance information may be determined for each dimension, and a dimension whose performance information meets a predetermined requirement (for example, a dimension whose performance is higher than a particular threshold or that has optimal performance) is selected from the plurality of dimensions as the target dimension. In such a manner, in this embodiment of the present application, it can be ensured that the computing resource can efficiently process the plurality of square matrices obtained by segmentation, thereby improving computing efficiency.

In some implementations of the first aspect, a value of the performance information corresponding to one dimension is related to a time required for computing, by the data processing device, an inverse matrix of the square matrix corresponding to the dimension.

In this application, because main time overheads of the computing resource come from inverse matrix operation of the square matrix, efficiency of the computing resource in resolving an inverse matrix of a corresponding square matrix is considered when a target segmentation dimension is selected. Therefore, in this embodiment of the present application, time overheads required for matrix inversion can be further reduced.

In some implementations of the first aspect, the segmenting the Kronecker factor matrix includes: selecting a target dimension from a plurality of dimensions based on information losses corresponding to the plurality of dimensions to segment the Kronecker factor matrix, where an information loss corresponding to one dimension indicates an information loss caused by using the dimension to segment a reference Kronecker factor matrix.

In some embodiments, for example, each dimension in a group of candidate dimensions may be used to segment the reference Kronecker factor matrix, to determine an information loss corresponding to each dimension. To more accurately evaluate an information loss in an actual training process, the reference Kronecker factor matrix may be, for example, a Kronecker factor matrix obtained after the neural network model is iterated for a predetermined quantity of times by using same training data.

In some embodiments, a corresponding information loss may be determined for each dimension, and a dimension whose information loss meets a predetermined requirement (for example, a dimension whose information loss is less than a particular threshold or that has a smallest information loss) is selected from the plurality of dimensions as the target dimension. In this application, an information loss is considered when a target segmentation dimension is selected. In this embodiment of the present application, time complexity of matrix inversion can be reduced, and computing precision of matrix inversion can be further ensured.

In some implementations of the first aspect, the information loss corresponding to one dimension is a difference between a spectral norm of the reference Kronecker factor matrix and a spectral norm of a union matrix of a plurality of square matrices obtained by segmenting the reference Kronecker factor matrix by using the dimension.

In this application, the information loss is quantized by using the spectral norms, so that the data processing device can more efficiently determine the target segmentation dimension.

In some implementations of the first aspect, the data processing device includes a computing resource used to perform the adjustment, and the segmenting the Kronecker factor matrix includes: selecting a target dimension from a plurality of dimensions based on performance information corresponding to the plurality of dimensions and information losses corresponding to the plurality of dimensions, to segment the Kronecker factor matrix, where performance information corresponding to the dimension indicates efficiency of the computing resource in processing a square matrix corresponding to the dimension, an information loss corresponding to the dimension indicates an information loss caused by using the dimension to segment a reference Kronecker factor matrix, and the target dimension indicates a rank of at least one of the plurality of square matrices obtained by segmenting the Kronecker factor matrix.

In some embodiments, corresponding performance information and a corresponding information loss may be determined for each dimension, and the target dimension may be determined based on the performance information and the information losses. For example, the target dimension can enable both the corresponding performance information and the corresponding information loss to meet a predetermined condition (for example, the performance information is higher than a particular threshold and the information loss is less than a particular threshold).

In some embodiments, the target dimension may alternatively be determined, for example, based on normalization results of the performance information and the information losses. For example, fitting functions between different candidate dimensions and the performance information and/ or the information losses are constructed, and the target dimension is determined by determining an intersection point of the fitting functions. In this application, both the performance information and the information losses are considered. Therefore, in this embodiment of the present application, a balance can be implemented between time costs and computing precision of matrix inversion, to prevent the computing precision from being excessively poor or prevent the computing efficiency from being excessively low.

In some implementations of the first aspect, the adjusting a parameter of the neural network model includes: processing the plurality of square matrices in parallel, to determine a plurality of inverse matrices of the plurality of square matrices; and adjusting the parameter of the neural network model based on a combination of the plurality of inverse matrices of the plurality of square matrices.

In this application, because at least some of the square matrices obtained by segmentation have a same rank, parallel processing is well supported. The time costs of matrix inversion can be further reduced by processing these square matrices in parallel.

In some implementations of the first aspect, the neural network model is an image processing model, and the obtaining a Kronecker factor matrix includes: obtaining image training data; and applying the image training data to the image processing model to obtain the Kronecker factor matrix.

In this application, an object processed by the neural network model may be image data. By using the method of the present application, the image analysis model can be more quickly trained, so that the image processing model can be more quickly put into use.

In some implementations of the first aspect, the neural network model is a text processing model, and the obtaining a Kronecker factor matrix includes: obtaining text training data; and applying the text training data to the text processing model to obtain the Kronecker factor matrix.

In this application, an object processed by the neural network model may be text data. By using the method of the present application, the text processing model can be more quickly trained, so that the text processing model can be more quickly put into use.

According to a second aspect of the present application, a data processing apparatus is provided, including an obtaining unit, configured to obtain Kronecker factor matrices that are used to indicate a higher-order information matrix of a neural network model, where the higher-order information matrix is used to correct a first-order gradient of the neural network model. The data processing apparatus further includes a segmentation unit, configured to segment the Kronecker factor matrix to obtain a plurality of square matrices, so that the plurality of square matrices are submatrices of the Kronecker factor matrix, and main diagonal lines of the plurality of square matrices each are in a one-to-one correspondence with a part of a main diagonal line of the Kronecker factor matrix. In addition, the data processing apparatus further includes an adjustment unit, configured to adjust a parameter of the neural network model based on the plurality of square matrices.

In the present application, the higher-order information matrix is a matrix that is generated in a training process of the neural network model and that is used to correct a first-order derivative of the model, for example, a Hessian matrix, a Fisher matrix, or a second-order moment matrix. The Kronecker factor matrices are a pair of matrices obtained by performing Kronecker decomposition on the higher-order information matrix, and a Kronecker product of the pair of matrices is equal to the higher-order information matrix.

In the present application, the segmentation unit may perform segmentation along the main diagonal line of the Kronecker factor matrix based on a predetermined segmentation dimension, to obtain the plurality of square matrices whose ranks are equal to the segmentation dimension first. In some cases, when a rank of the Kronecker factor matrix can be exactly divided by the segmentation dimension, a Kronecker factor is segmented into an integral quantity of square matrices with a same rank. In some other cases, when the rank of the Kronecker factor matrix can not be exactly divided by the segmentation dimension, the Kronecker factor is segmented into an integral quantity of square matrices with a same rank and one or more square matrix whose rank is less than the segmentation dimension.

Based on such segmentation, the main diagonal lines of the plurality of square matrices each are in a one-to-one correspondence with a part of the main diagonal line of the Kronecker factor matrix, that is, elements on all the main diagonal lines of the plurality of square matrices include all elements on the main diagonal line of the Kronecker factor matrix.

In such a manner, in this embodiment of the present application, the Kronecker factor matrix is converted into an approximation of the plurality of small square matrices, thereby greatly reducing time complexity of operation, and reducing time costs of model training.

In some implementations of the second aspect, the segmentation unit is further configured to segment the Kronecker factor matrix based on a resource identifier of a computing resource and a model identifier of the neural network model.

In some embodiments, the model identifier may be identification information indicating a type of the neural network model, for example, "resnet50" may indicate that the neural network model is a 50-layer deep residual network (ResNet). Examples of the model identifier may further include "resnet18", "resnet101", "VGG16", "LeNet5", and the like. In addition, the resource identifier may be identification information indicating a model number of the computing resource, for example, a chip name, a chip code, a chip type number, or even an identifier of a device in which a chip is located may be used as the resource identifier. For example, the resource identifier may be a specific model number of an AI chip configured to train the neural network model, for example, "GPU V100". Alternatively, the resource identifier may be a unique identifier of the computing resource, for example, a MAC address of the computing resource.

In some embodiments, the segmentation unit may determine, based on the resource identifier and the model identifier, the segmentation dimension used for segmenting the Kronecker factor matrix, and segment the Kronecker factor based on the segmentation dimension. For example, the segmentation unit may query a corresponding historical optimization policy based on the resource identifier and the model identifier, to determine the segmentation dimension used for segmenting the Kronecker factor matrix. Based on such a manner, in this embodiment of the present application, how to segment the Kronecker factor matrix can be quickly determined according to the historical optimization policy corresponding to the model and the computing resource, thereby further reducing computing costs.

In some implementations of the second aspect, the data processing device stores a correspondence among the resource identifier, the model identifier, and a dimension, and the dimension indicates a rank of at least one of the plurality of square matrices obtained by segmenting the Kronecker factor matrix.

In some embodiments, the correspondence among the resource identifier, the model identifier, and the dimension may be stored, for example, in a configuration file. The correspondence may be a correspondence among the resource identifier, the model identifier, and the dimension, or may be a correspondence between two of the resource identifier, the model identifier, and the dimension. In this embodiment of the present application, the correspondence among the resource identifier, the model identifier, and the dimension is maintained, to quickly implement a search based on the resource identifier and the model identifier, thereby efficiently determining an available optimization policy from the historical optimization policy.

In some implementations of the second aspect, the segmentation unit is further configured to select a target dimension from a plurality of dimensions based on performance information corresponding to the plurality of dimensions to segment the Kronecker factor matrix, where performance information corresponding to one dimension indicates efficiency of the computing resource in processing a square matrix corresponding to the dimension, and the target dimension indicates a rank of at least one of the plurality of square matrices obtained by segmenting the Kronecker factor matrix.

In some embodiments, the segmentation unit may select the target dimension based on the performance information corresponding to the plurality of dimensions, and segment the Kronecker factor matrix based on the dimension. For example, the plurality of dimensions may be a group of preset candidate dimensions. A group of sample square matrices corresponding to the group of candidate dimensions may be constructed, and performance information corresponding to different dimensions is determined by obtaining efficiency of the computing resource in processing these sample square matrices.

In some embodiments, the segmentation unit may determine corresponding performance information for each dimension, and select a dimension whose performance information meets a predetermined requirement (for example, a dimension whose performance is higher than a particular threshold or that has optimal performance) from the plurality of dimensions as the target dimension. In such a manner, in this embodiment of the present application, it can be ensured that the computing resource can efficiently process the plurality of square matrices obtained by segmentation, thereby improving computing efficiency.

In some implementations of the second aspect, a value of the performance information corresponding to one dimension is related to a time required for computing, by the data processing device, an inverse matrix of the square matrix corresponding to the dimension.

In this application, because main time overheads of the computing resource come from inverse matrix operation of the square matrix, efficiency of the computing resource in resolving an inverse matrix of a corresponding square matrix is considered when a target segmentation dimension is selected. Therefore, in this embodiment of the present application, time overheads required for matrix inversion can be further reduced.

In some implementations of the second aspect, the segmentation unit is further configured to select a target dimension from a plurality of dimensions based on information losses corresponding to the plurality of dimensions to segment the Kronecker factor matrix, where an information loss corresponding to one dimension indicates an information loss caused by using the dimension to segment a reference Kronecker factor matrix, and the target dimension indicates a rank of at least one of the plurality of square matrices obtained by segmenting the Kronecker factor matrix.

In some embodiments, the segmentation unit may use, for example, each dimension in a group of candidate dimensions to segment the reference Kronecker factor matrix, to determine an information loss corresponding to each dimension. To more accurately evaluate an information loss in an actual training process, the reference Kronecker factor matrix may be, for example, a Kronecker factor matrix obtained after the neural network model is iterated for a predetermined quantity of times by using same training data.

In some embodiments, the segmentation unit may determine a corresponding information loss for each dimension, and select a dimension whose information loss meets a predetermined requirement (for example, a dimension whose information loss is less than a particular threshold or that has a smallest information loss) from the plurality of dimensions as the target dimension. In this application, an information loss is considered when a target segmentation dimension is selected. In this embodiment of the present application, time complexity of matrix inversion can be reduced, and computing precision of matrix inversion can be further ensured.

In some implementations of the second aspect, the information loss corresponding to one dimension is a difference between a spectral norm of the reference Kronecker factor matrix and a spectral norm of a union matrix of a plurality of square matrices obtained by segmenting the reference Kronecker factor matrix by using the dimension.

In this application, the information loss is quantized by using the spectral norms, so that the data processing device can more efficiently determine the target segmentation dimension.

In some implementations of the second aspect, the segmentation unit is further configured to select a target dimension from a plurality of dimensions based on performance information corresponding to the plurality of dimensions and information losses corresponding to the plurality of dimensions, to segment the Kronecker factor matrix, where performance information corresponding to one dimension indicates efficiency of the computing resource in processing a square matrix corresponding to the dimension, an information loss corresponding to one dimension indicates an information loss caused by using the dimension to segment a reference Kronecker factor matrix, and the target dimension indicates a rank of at least one of the plurality of square matrices obtained by segmenting the Kronecker factor matrix.

In some embodiments, the segmentation unit may determine corresponding performance information and a corresponding information loss for each dimension, and determine the target dimension based on the performance information and the information losses. For example, the target dimension can enable both the corresponding performance information and the corresponding information loss to meet a predetermined condition (for example, the performance information is higher than a particular threshold and the information loss is less than a particular threshold).

In some embodiments, the target dimension may alternatively be determined, for example, based on normalization results of the performance information and the information losses. For example, fitting functions between different candidate dimensions and the performance information and/ or the information losses are constructed, and the target dimension is determined by determining an intersection point of the fitting functions. In this application, both the performance information and the information losses are considered. Therefore, in this embodiment of the present application, a balance can be implemented between time costs and computing precision of matrix inversion, to prevent the computing precision from being excessively poor or prevent the computing efficiency from being excessively low.

In some implementations of the second aspect, the adjustment unit is configured to: process the plurality of square matrices in parallel first, to determine a plurality of inverse matrices of the plurality of square matrices; and adjust the parameter of the neural network model based on a combination of the plurality of inverse matrices of the plurality of square matrices.

In this application, because at least some of the square matrices obtained by segmentation have a same rank, parallel processing is well supported. The time costs of matrix inversion can be further reduced by processing these square matrices in parallel.

In some implementations of the second aspect, the neural network model is an image processing model. The obtaining unit is configured to: obtain image training data; and apply the image training data to the image processing model to obtain the Kronecker factor matrix.

In this application, an object processed by the neural network model may be image data. By using the method of the present application, an image processing model can be more quickly trained, so that the image processing model can be more quickly put into use.

In some implementations of the second aspect, the neural network model is a text processing model. The obtaining unit is configured to: obtain text training data; and apply the text training data to the text processing model to obtain the Kronecker factor matrix.

In this application, an object processed by the neural network model may be text data. By using the method of the present application, the text processing model can be more quickly trained, so that the text processing model can be more quickly put into use.

According to a third aspect of the present application, an electronic device is provided, including at least one computing unit and at least one memory, where the at least one memory is coupled to the at least one computing unit and stores instructions executable by the at least one computing unit, and when the instructions are executed by the at least one computing unit, the device is enabled to implement the method according to the first aspect or any implementation of the first aspect.

According to a fourth aspect of the present application, a computer-readable storage medium is provided. The computer-readable storage medium stores one or more computer instructions, and the one or more computer instructions are executed by a processor to implement the method according to the first aspect or any implementation of the first aspect.

According to a fifth aspect of the present application, a computer program product is provided. When the computer program product runs on a computer, the computer is enabled to execute instructions for some or all of the steps of the method according to the first aspect or any implementation of the first aspect.

It can be understood that the electronic device provided in the third aspect, the computer storage medium provided in the fourth aspect, or the computer program product provided in the fifth aspect is used to perform the method provided in the first aspect. Therefore, the explanations or descriptions of the first aspect are also applicable to the third aspect, the fourth aspect, and the fifth aspect. In addition, for beneficial effects that can be achieved in the third aspect, the fourth aspect, and the fifth aspect, refer to the beneficial effects in the corresponding method. Details are not described herein again.

BRIEF DESCRIPTION OF DRAWINGS

With reference to the accompanying drawings and the following detailed descriptions, the foregoing and other features, advantages, and aspects of embodiments of the present application will become more apparent. In the accompanying drawings, the same or similar reference signs of the accompanying drawings are used to represent the same or similar elements.

FIG. 7A to FIG. 7C are schematic diagrams of segmenting a Kronecker factor matrix according to some embodiments of the present application;

DESCRIPTION OF EMBODIMENTS

Figure 1:
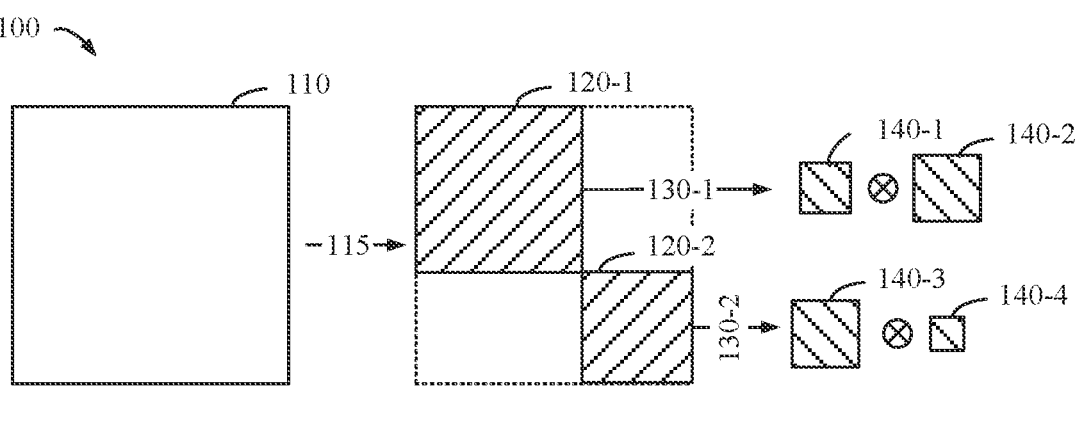
FIG. 1 is a schematic diagram of a decomposition process of a higher-order information matrix of a deep learning model.

The following describes embodiments of the present application in more detail with reference to the accompanying drawings. Although some embodiments of the present application are shown in the accompanying drawings, it should be understood that the present application may be implemented in various forms, and should not be construed as being limited to the embodiments described herein. Instead, these embodiments are provided for a more thorough and complete understanding of the present application. It should be understood that the accompanying drawings and embodiments of the present application are merely used as examples and are not intended to limit the protection scope of the present application.

In the descriptions of embodiments of the present application, the term "including" and similar terms thereof shall be understood as non-exclusive inclusions, that is, "including but not limited to". The term "based on" should be understood as "at least partially based on". The term "one embodiment" or "this embodiment" should be understood as "at least one embodiment". The terms "first", "second", and the like may refer to different or the same objects. Other explicit and implied definitions may also be included below.

As discussed above, with development of computer technologies, machine learning technologies have been applied to many fields such as image recognition, natural language processing, audio analysis, and video analysis. With widespread application of the machine learning technologies, people also pay more attention to a training process of a machine learning model. People expect a more robust trained model, and also expect a shortened time required for model convergence. Therefore, optimization of the machine learning model becomes an important part of machine learning.

Common optimization algorithms include a first-order optimization algorithm and a higher-order optimization algorithm. A gradient descent algorithm is a common first-order optimization algorithm, and an update process of a parameter based on the gradient descent algorithm may be represented as a formula (1):

$$\theta = \theta - \eta \nabla_\theta \qquad (1)$$

$\theta$ is a parameter that needs to be updated in the machine learning model, $\eta$ is a learning rate, and $\Lambda_\theta$ is a first-order gradient of a loss function for the parameter. In addition, based on the gradient descent algorithm, there are some optimization algorithms in which policies such as momentum and adaptive learning rate decay are introduced, for example, Momentum, Nesterov, AdaGrad, RMSprop, Adadelta, and Adam. In these improved optimization algorithms, for example, a step size may be adaptively updated by using historical information of a random gradient, so that parameter adjustment is more easily implemented based on these improved optimization algorithms. However, in dealing with most problems, performance of these improved optimization algorithms is not much higher than that of a random gradient descent algorithm obtained based on precise parameter adjustment. In addition, considering that a loss function of a neural network is a highly non-convex function, and a curvature of a curved surface is unbalanced, performance of the first-order optimization algorithm is less ideal.

Based on the first-order optimization algorithm, some methods propose to use higher-order gradient information to direct parameter update. Such an optimization algorithm is also referred to as a higher-order optimization algorithm. In the higher-order optimization algorithm, a direction and a step size of a first-order gradient are corrected by using a higher-order derivative of a target function, thereby increasing a convergence speed of training of the entire neural network. In a training process, in the higher-order optimization algorithm, an optimal value can be highly approximated, and a geometric descending path is also more consistent with an actual optimal descending path.

Compared with the first-order optimization algorithm, updating of a parameter based on the higher-order optimization algorithm may be represented as a formula (2):

$$\theta = \theta - \eta IM^{-1} \nabla_\theta \qquad (2)$$

$\theta$ is the parameter that needs to be updated, $\eta$ is a learning rate, $\nabla_\theta$ is a first-order gradient of a loss function for the parameter, and IM is a higher-order information matrix. Different higher-order optimization algorithms may have different definitions for the higher-order information matrix. For example, a higher-order information matrix corresponding to a Newton optimization algorithm is a Hessian (Hessian) matrix, which is a square matrix that includes all second-order partial derivatives of a multi-variable real-valued function. A higher-order information matrix corresponding to a natural gradient method is a Fisher (Fisher) matrix, which is a covariance matrix derived from a maximum likelihood function.

Although a convergence speed of the higher-order optimization algorithm is high, time complexity of computing an inverse of the higher-order information matrix is $O(n^3)$. Therefore, how to use an efficient higher-order optimization algorithm to ensure training precision while reducing time complexity of the optimization algorithm becomes a focus of current attention.

In some existing algorithms, the time complexity of computing the inverse of the higher-order information matrix is reduced in an approximation manner. For example, in a KFAC (Kronecker-factored Approximate Curvature) algorithm, a Fisher matrix is decomposed into block matrices based on a network layer, and each block matrix is approximated as a Kronecker (Kronecker) product of two much smaller matrices. Because an inverse of the Kronecker product of the two matrices is equal to a Kronecker product of inverses of the two matrices, and it is easier to compute and inverse the two small matrices than the entire block matrix, computing of the Fisher matrix is greatly simplified through such decomposition and approximation based on the KFAC optimization algorithm.

FIG. 1 shows an example process 100 of the KFAC algorithm. As shown in FIG. 1, a higher-order information matrix 110 of a model is grouped and diagonally approximated based on a weight of a given layer. For example, a higher-order information matrix of a 3-4-2 neural network (to be specific, including one input layer, one hidden layer, and one output layer, where the input layer includes three nodes, the hidden layer includes four nodes, and the output layer includes two nodes) is a 20*20 matrix. As shown in FIG. 1, at 115, the higher-order information matrix 110 may be approximated, for example, to a 12*12 matrix 120-1 and an 8*8 matrix 120-2.

Further, at 130-1 and 130-2, the matrix 120-1 and the matrix 120-2 are separately decomposed into corresponding Kronecker factor matrices through Kronecker decomposition. For example, the 12*12 matrix 120-1 may be decomposed into a 3*3 Kronecker factor matrix 140-1 and a 4*4 Kronecker factor matrix 140-2, and the 8*8 matrix 120-2 may be decomposed into a 4*4 Kronecker factor matrix 140-3 and a 2*2 Kronecker factor matrix 140-4.

Such an optimization algorithm has a good effect on a neural network with a simple structure. However, for a large-scale model, such an optimization algorithm still has a disadvantage of high computing complexity. For example, when training of a resnet 50 neural network is optimized by using the KFAC algorithm shown in FIG. 1, because a dimension of a fully-connected layer of the resnet 50 neural network is 2048*1000, inverse matrices of a 2048-dimensional matrix and a 1000-dimensional matrix still need to be computed after the optimization. Although an inversion time is greatly shortened, such a speed is still difficult to meet a requirement of current application. It is experimentally found that, for the resnet50 model, a time of a single iteration of the KFAC optimization algorithm on an ima-genet universal set is about 33 times that of the first-order optimization algorithm.

The following describes a parameter optimization solu-tion according to embodiments of the present application. For ease of description, the following describes aspects of the present application by using different subsections. These subsections are not intended to be different embodiments of the present application. On the contrary, technical features described in different subsections may be combined without departing from the present application.

Basic Principle and Example Environment

To resolve at least a problem of high time complexity of a higher-order optimization algorithm, embodiments of the present application provide a parameter optimization solu-tion. In embodiments of the present application, after Kro-necker factor matrices that are used to indicate a higher-order information matrix of a neural network model are obtained, the Kronecker factor matrix is segmented to obtain a plurality of square matrices, so that each element on a main diagonal line of the Kronecker factor matrix is included in a single square matrix of the plurality of square matrices and is located on a main diagonal line of the single square matrix. Then, a parameter of the neural network model is adjusted based on inversion operation of the plurality of obtained square matrices. Based on such a manner, in this embodiment of the present application, a dimension of a matrix on which inversion computing needs to be performed can be further reduced, thereby reducing time complexity of an optimization algorithm, and further accelerating a train-ing process of the neural network model.

Figure 2:
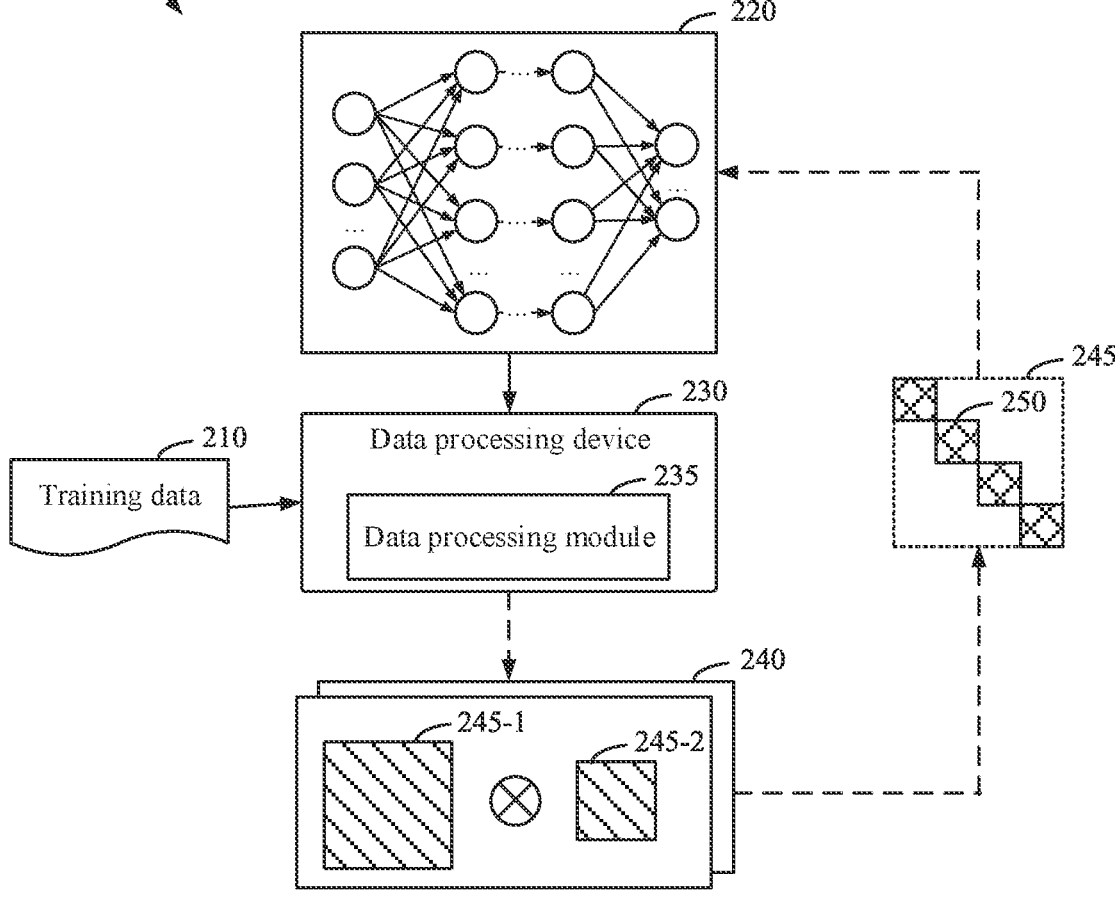
FIG. 2 is a schematic diagram of an example environment in which a plurality of embodiments of the present application can be implemented.

FIG. 2 is a schematic diagram of an example environment 200 in which a plurality of embodiments of the present application can be implemented. As shown in FIG. 2, the environment 200 includes a data processing device 230. The data processing device 230 may receive training data 210 and a neural network model 220. The model 220 can learn some knowledge and capabilities from existing data to process new data. The model 220 may be designed to perform various tasks such as image classification, target detection, voice recognition, machine translation, and con-tent filtering. Examples of the model 220 include but are not limited to various types of deep neural networks (DNN) and recurrent neural networks (RNN). In this embodiment of the present application, the model 220 may also be referred to as a "machine learning model". In the following, terms "neural network", "learning model", "learning network", "model", and "network" may be interchanged. The data processing device 230 should have a specific computing capability to meet a requirement of a computing resource that implements the method in this application. A specific form of the data processing device 230 is not limited in the present application. For example, the data processing device 230 may be a network device or a terminal device.

The model 220 is shown as a deep neural network in FIG. 2. The deep neural network has a hierarchical architecture, and each processing layer (also referred to as network layer) has one or more processing units (also referred to as pro-cessing nodes, neurons, or filters), to process an input based on a corresponding parameter. In the deep neural network, an output obtained after processing by a previous layer is an input of a next layer, where the first layer in the architecture receives a network input for processing, and an output of the last layer is provided as a network output. Parameters used by all the processing units of the model 220 for processing constitute a parameter set of the model 220. Specific values of such a parameter set need to be determined in a training process.

It should be understood that both the architecture of the model 220 shown in FIG. 2 and quantities of processing layers and processing units in the model 220 are used as an example and are not intended to be a limitation. In different application, a prediction model may be designed as required to have another appropriate architecture and/or an appropri-ate quantity of processing layers, and each processing layer may have an appropriate quantity of processing units.

In some embodiments, the training data 210 received by the data processing device 230 is data corresponding to the model 220. For example, when the model 220 is an image processing model, the training data 210 may be image training data. When the model 220 is a text processing model, the training data 210 may be text training data. In some other application scenarios, the training data may alternatively be an appropriate type of training data, for example, voice data, video data, medical data, or commer-cial data.

As shown in FIG. 2, a data processing module 235 is implemented on the data processing device 230. The data processing module 235 may be implemented as one or more software engines, hardware components, a combination thereof, or the like, and is configured with logic for imple-menting a function of a corresponding module. When being executed, the data processing module 235 enables the data processing device 230 to perform the following operations: obtaining Kronecker factor matrices 245-1 and 245-2 (indi-vidually or collectively referred to as a Kronecker factor matrix 245) that indicate a higher-order information matrix 240; segmenting the obtained Kronecker factor matrix 245 to obtain a plurality of square matrices 250; and adjusting a parameter of the model 220 by performing inversion opera-tion on the plurality of square matrices 250. It should be understood that, for ease of description, although a process of determining the square matrices 250 from the Kronecker factor matrix 245 is shown in FIG. 2 as being outside the data processing device 230, the process may still be imple-mented by the data processing device 230. Based on such a manner, in this embodiment of the present application, time complexity of the higher-order optimization algorithm can be further reduced, thereby reducing time costs of model training.

Example Architecture of Data Processing Module

Figure 3:
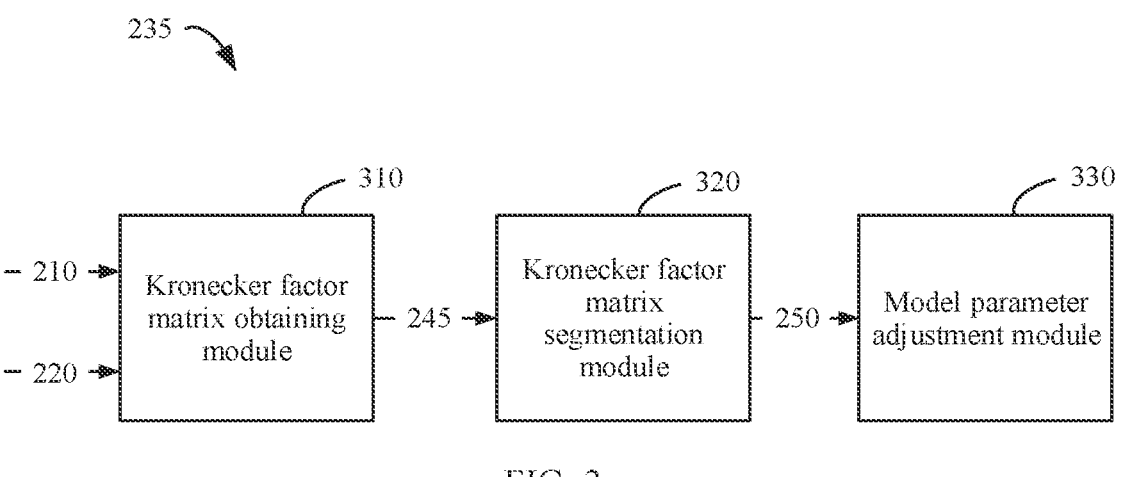
FIG. 3 shows a structure of an example data processing module according to some embodiments of the present application.

First, FIG. 3 is a block diagram of an example data processing module 235 according to some embodiments of the present application. As shown in FIG. 3, the data processing module 235 includes a plurality of modules configured to implement the example data processing pro-cess according to some embodiments of the present appli-cation. As shown in FIG. 3, the data processing module 235 includes a Kronecker factor matrix obtaining unit 310, a Kronecker factor matrix segmentation module 320, and a model parameter adjustment unit 330.

In some embodiments, the training data 210 and the model 220 may be provided to the Kronecker factor matrix obtaining unit 310 as inputs. The Kronecker factor matrix obtaining unit 310 may iteratively adjust the parameter of the model 220 by using the training data 210, and obtain, based on an intermediate result of forward computing and reverse propagation in the training process, the Kronecker factor matrix 245 that is used to indicate the higher-order information matrix 240 of the model 220.

In the present application, the higher-order information matrix 240 is a matrix used to correct a first-order gradient of the model 220, and examples of the higher-order information matrix 240 include but are not limited to the Hessian matrix, the Fisher matrix, and the second-order moment matrix described above. It should be understood that the higher-order information matrix 240 shown in FIG. 2 is merely used to indicate that the pair of Kronecker factor matrices 245 is used to indicate one higher-order information matrix, and it is not required that the higher-order information matrix 240 is computed in the training process. In some existing optimization algorithms, the Kronecker factor matrix 245 of the higher-order information matrix 240 may be directly computed.

In some embodiments, the obtained Kronecker factor matrix 245 may be a Kronecker factor matrix 245 generated in a process including any quantity of iterations. For example, for the previously untrained model 220, the obtained Kronecker factor matrix 245 may be a Kronecker factor matrix generated based on an initial parameter of the model 220. Alternatively, the obtained Kronecker factor matrix 245 may be a Kronecker factor matrix generated after several iterations. In some other alternative embodiments, the model 220 may be previously pre-trained. In this case, the obtained Kronecker factor matrix 245 may alternatively be a Kronecker factor matrix generated by continuing iteration based on a pre-trained parameter.

As discussed above, the model 220 may generate a plurality of pairs of Kronecker factor matrices 245 in an iteration process. For example, a resnet 50 model includes 53 convolutional layers and one fully-connected layer, and the resnet 50 model generates 54 higher-order information matrices in an iteration process. Each higher-order information matrix is approximated as a pair of Kronecker factor matrices. That is, the resnet50 model generates a total of 108 Kronecker factor matrices in a parameter iteration process. For ease of description, in a pair of Kronecker factor matrices, a matrix located in front of a Kronecker product operator is referred to as a left factor matrix, and a matrix located behind the Kronecker product operator is referred to as a right factor matrix.

In some embodiments, the Kronecker factor matrix obtaining unit 310 may obtain all Kronecker factor matrices generated by the model 220 in the iteration process, and provide the Kronecker factor matrices to the Kronecker factor matrix segmentation module 320 as outputs.

Alternatively, the Kronecker factor matrix obtaining unit 310 may obtain only one, any pair, or any other quantity of matrices from all the Kronecker factor matrices, and provide the matrix, the pair of matrices, or the any other quantity of matrices to the Kronecker factor matrix segmentation module 320 as outputs. For example, considering that dimensions of some Kronecker factor matrices are small, and time complexity of inversion operation for the Kronecker factor matrices is low, the Kronecker factor matrix obtaining unit 310 may select only a Kronecker factor matrix whose matrix dimension exceeds a predetermined threshold, and provide the Kronecker factor matrix to the Kronecker factor matrix segmentation module 320 as an input.

As shown in FIG. 3, the data processing module 235 further includes the Kronecker factor matrix segmentation module 320. After receiving the Kronecker factor matrix 245 provided by the Kronecker factor matrix obtaining unit 310, the Kronecker factor matrix segmentation module 320 may determine a corresponding segmentation policy, and segment the Kronecker factor matrix 245 based on the segmentation policy to obtain the plurality of square matrices 250, where the plurality of square matrices 250 correspond to elements on a diagonal line of the Kronecker factor matrix 245. Based on such segmentation, an inverse matrix of the Kronecker factor matrix 245 can be approximated as a combination of inverses of the plurality of obtained square matrices 250.

In some embodiments, the segmentation policy used by the Kronecker factor matrix segmentation module 320 may be pre-stored, and the Kronecker factor matrix segmentation module 320 may obtain, for example, the pre-stored segmentation policy by using a model identifier of the model 220 and a resource identifier of a target device that is about to optimize the model 220. Alternatively, the segmentation policy may be determined in real time by the Kronecker factor matrix obtaining unit 310 based on the model 220 and the target device that is about to optimize the model 220. A process of segmenting the Kronecker factor matrix is described in detail below.

The plurality of square matrices 250 obtained by segmentation by the Kronecker factor matrix segmentation module 320 are further provided to the model parameter adjustment unit 330 in FIG. 3. The model parameter adjustment unit 330 may compute, for example, respective inverse matrices of the plurality of obtained square matrices 250, and determine a parameter adjustment for the model 220 by using a combination (whose value is approximate to the inverse matrix of the Kronecker factor matrix 245) of the inverse matrices of the plurality of square matrices 250, to direct training of the model 220. A model parameter adjustment process is described in detail below.

It should be understood that the module in FIG. 3 may be implemented as one or more software engines, hardware components, a combination thereof, or the like, and is configured with logic for implementing a function of a corresponding module. The software engine or the like is executed on one or more processors of one or more computing systems or devices, and data stored in one or more storage devices or memories or the like on the one or more computing systems is used or an operation is performed on data stored in one or more storage devices or memories or the like on the one or more computing systems. In some embodiments, different modules in FIG. 3 may be implemented as a single module, and a single module in FIG. 3 may be split into a plurality of modules. In some implementations, the data processing module 235 may further include one or more additional modules.

Kronecker Factor Matrix Segmentation

As discussed above, the Kronecker factor matrix segmentation module 320 is configured to segment the received Kronecker factor matrix 245 according to a particular segmentation policy, to obtain the plurality of square matrices 250. In some embodiments, the Kronecker factor matrix segmentation module 320 may determine, by querying a configuration file, whether a segmentation policy corresponding to the model 220 and the computing resource used to train the model 220 is stored.

Figure 4:
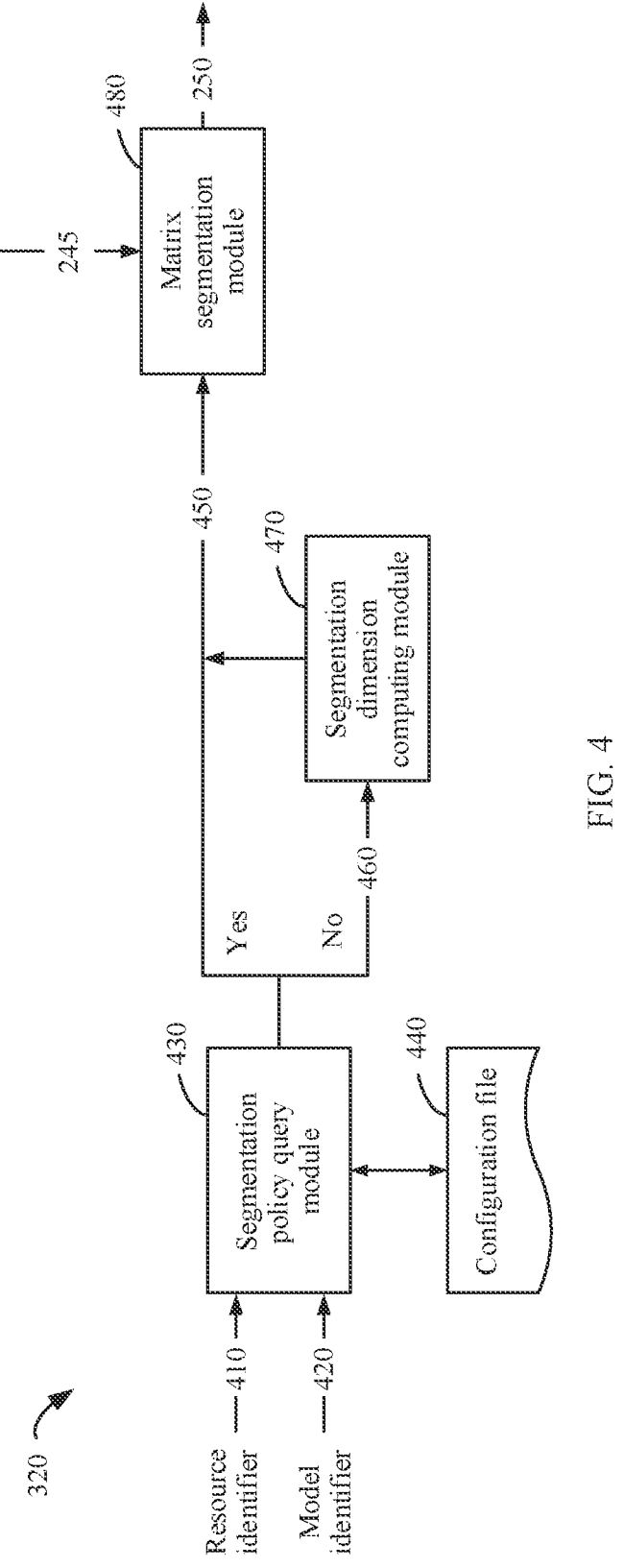
FIG. 4 shows a structure of an example Kronecker factor matrix segmentation module according to some embodiments of the present application.

FIG. 4 is a block diagram of an example Kronecker factor matrix segmentation module 320 according to some embodiments of the present application. In some embodiments, the Kronecker factor matrix segmentation module 320 may include a segmentation policy query module 430. The segmentation policy query model 430 may be configured to obtain a resource identifier 410 of the computing resource and a model identifier 420 of the model 220, where the computing resource may be, for example, an AI chip configured to train a machine learning model, including but not limited to a GPU (graphics processing unit), an FPGA (field programmable gate array), and an ASIC (application-specific integrated circuit).

Further, the segmentation policy query module 430 may query a configuration file 440 based on the resource identifier 410 and the model identifier 420, to determine whether the segmentation policy corresponding to the model 220 and the computing resource is maintained. In some embodiments, the configuration file 440 may include a correspondence among the resource identifier 410, the model identifier 420, and the corresponding segmentation policy. The correspondence indicates that an optimization policy previously determined for a computing resource corresponding to the resource identifier 410 and a model corresponding to the model identifier 420 exists. Such an optimization policy may be determined by the same data processing device 230, may be determined by different computing devices, or may be manually configured by a developer based on mathematical computation, an experiment, or experience. It should be understood that the configuration file 440 is merely an example form for maintaining such a mapping relationship and such mapping may alternatively be maintained in any appropriate manner. This is not limited in the present application.

The model identifier may be identification information indicating a type of the neural network model, for example, "resnet50" may indicate that the neural network model is a 50-layer deep residual network (ResNet). Examples of the model identifier may further include "resnet18", "resnet101", "VGG16", "LeNet5", and the like. In addition, the resource identifier may be identification information indicating a model number of the computing resource, for example, a chip name, a chip code, a chip type number, or even an identifier of a device in which a chip is located may be used as the resource identifier. Computing resources of a same model number usually have same or similar performance. For example, the resource identifier may be a specific model number of the AI chip configured to train the model 220. In this case, the segmentation policy query module 430 queries the configuration file 440 for existence of an optimization policy corresponding to a same type of computing resource and a same type of model without requiring a same computing resource. For example, the segmentation policy query module 430 may query whether an optimization policy corresponding to a model number "GPU V100" and the model "resnet50" exists.

Alternatively, the resource identifier may be a unique identifier of the computing resource, for example, a MAC address of the computing resource. In this case, the segmentation policy query module 430 queries the configuration file 440 for existence of an optimization policy specific to the computing resource and the model 220. For example, the segmentation policy query module 430 may query whether an optimization policy corresponding to a GPU with a MAC address "abcd" and the model "resnet50" exists.

As shown in FIG. 4, when determining that a corresponding optimization policy exists in the configuration file 440, the segmentation policy query module 430 may determine a segmentation dimension 450 from the optimization policy, and send the segmentation dimension 450 to a matrix segmentation module 480. In some embodiments, the optimization policy may include, for example, a segmentation dimension for the left factor matrix and a segmentation dimension for the right factor matrix. The segmentation policy query module 430 may send at least one of the segmentation dimension for the left factor matrix and the segmentation dimension for the right factor matrix to the matrix segmentation module 480.

For example, the configuration file 440 may include, for example, mapping among a resource identifier "chip ABC", a model identifier "resnet50", a left factor matrix segmentation dimension "128", and a right factor matrix segmentation dimension "1". When determining that the resource identifier of the computing resource is "chip ABC" and the model identifier is "resnet 50", the segmentation policy query module 430 may query the configuration file 440 to obtain the corresponding segmentation policy: the left factor matrix segmentation dimension "128" and the right factor matrix segmentation dimension "1". Then, the segmentation policy query module 430 may send, for example, both the left factor matrix segmentation dimension "128" and the right factor matrix segmentation dimension "1" to the matrix segmentation module 480.

Figure 5:
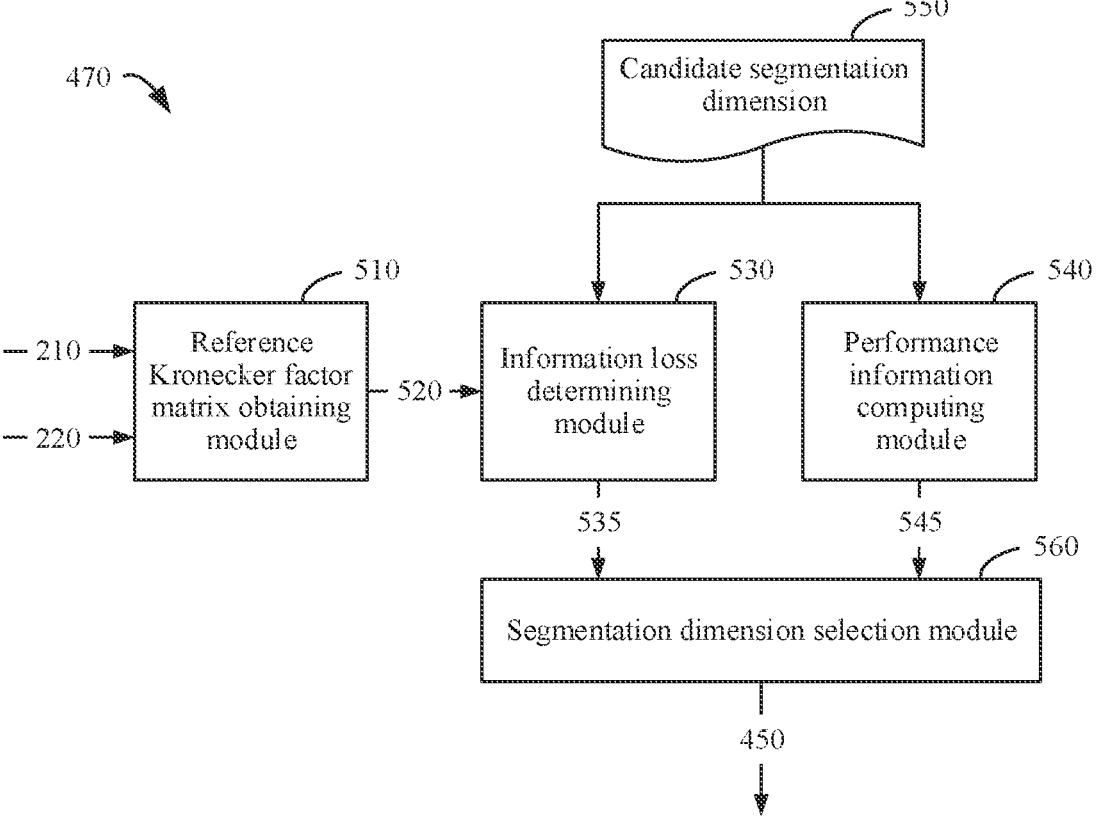
FIG. 5 shows a structure of an example segmentation dimension computing module according to some embodiments of the present application.

In some embodiments, when determining that the corresponding segmentation policy does not exist in the configuration file 440, the segmentation policy query module 430 may provide a segmentation dimension computing module 470 with an indication 460 that no existing segmentation policy exists, so that the segmentation dimension computing module 470 computes the segmentation dimension 450 corresponding to the model 220 and the computing resource. The following describes the segmentation dimension computing module 470 with reference to FIG. 5. FIG. 5 is a block diagram of an example segmentation dimension computing module 470 according to some embodiments of the present application.

As shown in FIG. 5, in some embodiments, the segmentation dimension computing module 470 may include a reference Kronecker factor matrix obtaining unit 510. To avoid an excessively large change trend of the Kronecker factor matrix used to determine the segmentation dimension, the reference Kronecker factor matrix obtaining unit 510 may receive the training data 210 and the model 220 to perform a predetermined quantity of parameter iterations on the model 220. Only after a change of the Kronecker factor matrix is stable, a reference Kronecker factor matrix 520 is extracted as an input of an information loss determining module 530.

To more accurately estimate an information loss caused by segmentation on the Kronecker factor matrix generated in an actual training process, the reference Kronecker factor matrix 520 extracted by the reference Kronecker factor matrix obtaining unit 510 may be all Kronecker factor matrices generated in a process of iterating the parameter of the model 220 by using the training data 210. The resnet 50 model is used as an example. The reference Kronecker factor matrix obtaining unit 510 may provide, for example, to the information loss determining module 530 as inputs, 108 reference Kronecker factor matrices 520 generated after the parameter of the model 220 is iterated 20 times based on the training data 210.

In some embodiments, the information loss determining module 530 may receive a plurality of reference Kronecker factor matrices 520 and a plurality of candidate segmentation dimensions 550, and compute an information loss of each reference Kronecker factor matrix 520 in each candidate segmentation dimension 550. For example, the candidate segmentation dimensions 550 may be, for example, [1, 16, 32, 64, 128, 256, 512, 1024, 2048], and the information loss determining module 530 may use each dimension in the list to perform diagonal segmentation on the reference Kronecker factor matrix 520 to obtain a plurality of candidate square matrices, and compute a corresponding information loss 535.

For example, if a selected segmentation dimension is 16 and a to-be-segmented reference Kronecker factor matrix 520 is a 64*64 matrix, then the information loss determining module 530 segments the reference Kronecker factor matrix 520 into four 16*16 candidate square matrices along a diagonal line.

For another example, if a selected segmentation dimension is 16 and a to-be-segmented reference Kronecker factor matrix 520 is a 70*70 matrix, then the information loss determining module 530 may segment the reference Kronecker factor matrix 520 into four 16*16 candidate square matrices and one 6*6 candidate square matrix along a diagonal line. A segmentation process of the reference Kronecker factor matrix 520 may be similar to a segmentation process of the Kronecker factor matrix 245 that is described in detail below with respect to the matrix segmentation module 480.

In some embodiments, the information loss 535 may indicate an information difference between a union matrix of the plurality of candidate square matrices and the segmented reference Kronecker factor matrix 520. In some embodiments, the information loss determining module 530 may select a spectral norm of a matrix as an information metric, and determine a difference between a spectral norm of the reference Kronecker factor matrix 520 and a spectral norm of the union matrix of the plurality of candidate square matrices. It should be understood that another appropriate information metric may alternatively be used to determine the information loss 535.

In some embodiments, a segmentation dimension selection module 560 may determine the segmentation dimension 450 from the candidate segmentation dimensions 550 based on the received information loss 535. For example, the segmentation dimension selection module 560 may compare the information losses 535 corresponding to different candidate dimensions with a loss threshold. Such a loss threshold may be manually configured, for example, by a developer as required. The resnet50 is used as an example. The segmentation dimension selection module 560 may compare a loss sum that is of information losses of left factor matrices and that corresponds to each candidate segmentation dimension 550 with the loss threshold, and only a candidate segmentation dimension 550 that corresponds to a loss sum less than the loss threshold is reserved.

When a quantity of candidate segmentation dimensions reserved based on the loss threshold is still greater than one, the segmentation dimension selection module 560 may select, for example, a smallest segmentation dimension to reduce time complexity. In addition, the segmentation dimension selection module 560 may further introduce another additional factor (for example, performance information described below), to perform selection from the reserved candidate segmentation dimensions.

In some embodiments, the segmentation dimension selection module 560 may further receive a designation for a tolerable information loss. For example, the segmentation dimension selection module 560 may receive an input about the tolerable information loss, and a range of the tolerable information loss may be set to, for example, 0% to 100%, where a larger value indicates a larger tolerable information loss. Further, the segmentation dimension selection module 560 may compute a ratio of the information difference between the union matrix of the plurality of candidate square matrices and the segmented reference Kronecker factor matrix 520 to an information amount of the segmented reference Kronecker factor matrix 520, and compare the ratio with the tolerable information loss.

Subsequently, the segmentation dimension selection module 560 may separately compute a proportion of a quantity of Kronecker factor matrices that meet the tolerable information loss in all left factor matrices and in all right factor matrices. For example, Table 1 and Table 2 respectively show example proportion cases of left factor matrices and right factor matrices that meet the loss when the tolerable information loss is 1%.

TABLE 1

| Left factor matrix information loss statistics | | | | | | | | | |
|---|---|---|---|---|---|---|---|---|---|
| Candidate segmentation dimension | 1 | 16 | 32 | 64 | 128 | 256 | 512 | 1024 | 2048 |
| Quantity of matrices whose information losses are less than 1% | 4 | 4 | 5 | 9 | 13 | 23 | 32 | 46 | 48 |

TABLE 2

| Right factor matrix information loss statistics | | | | | | | | | |
|---|---|---|---|---|---|---|---|---|---|
| Candidate segmentation dimension | 1 | 16 | 32 | 64 | 128 | 256 | 512 | 1024 | 2048 |
| Quantity of matrices whose information losses are less than 1% | 54 | 54 | 54 | 54 | 54 | 54 | 54 | 54 | 54 |

It can be learned from Table 1 that a size change of the candidate segmentation dimension greatly affects the information loss of the left factor matrix. On the contrary, it can be learned from the data in Table 2 that all the candidate segmentation dimensions enable all the right factor matrices to meet the required 1% information loss.

In some embodiments, the segmentation dimension selection module 560 may compare, for example, a quantity of matrices that meet the tolerable information loss or a proportion of a quantity of matrices that meet the tolerable information loss in a total quantity with a predetermined threshold, and select a candidate segmentation dimension that can meet a threshold requirement. In the examples in Table 1 and Table 2, for example, the segmentation dimension selection module 560 may select a candidate segmentation dimension that enables a proportion of matrices meeting the tolerable information loss to exceed 50%. In the example in Table 1, after the candidate segmentation dimension is greater than or equal to 256, the proportion of matrices meeting the tolerable information loss exceeds 50%. In the example in Table 2, all the candidate segmentation dimensions enable the proportion of matrices meeting the tolerable information loss to be greater than 50%.

The segmentation dimension selection module 560 may further select, for example, a smallest candidate segmentation dimension from the candidate segmentation dimensions that meet the threshold requirement. In this way, an information loss requirement can be met, and computing complexity can be minimized. For the examples in Table 1 and Table 2, the segmentation dimension selection module 560 may select, for example, "256" as a segmentation dimension for the left factor matrix and "1" as a segmentation dimension for the right factor matrix.

In some embodiments, as shown in FIG. 5, the segmentation dimension computing module 470 further includes a performance information computing module 540, configured to compute performance information 545 corresponding to the candidate segmentation dimensions 550. The performance information 545 may indicate, for example, efficiency of the computing resource used to optimize the model 220 in processing the square matrices corresponding to the candidate segmentation dimensions 550. In some embodiments, the performance information computing module 540 may set a group of predetermined candidate segmentation dimensions 550, and construct a group of sample square matrices corresponding to the candidate segmentation dimensions 550. Each square matrix in the sample square matrices has a rank corresponding to a segmentation dimension. For example, when the candidate segmentation dimension 550 is "5", a corresponding sample square matrix may be a 5*5 square matrix. The performance information computing module 540 may obtain performance information of the computing resource in processing the sample square matrices as the performance information corresponding to the candidate segmentation dimensions 550.

The candidate segmentation dimensions [1, 16, 32, 64, 128, 256, 512, 1024, 2048] are used as an example. The performance information computing module 540 may enable, for example, the computing resource to separately compute an inverse matrix of a sample square matrix with a corresponding rank, and obtain processing duration of the computing resource as corresponding performance information 545. It should be understood that another appropriate processing process (for example, matrix multiplication) may alternatively be selected to evaluate performance information of the computing resource in processing a corresponding sample square matrix. For example, Table 3 shows example performance information of the computing resource in computing inverse matrices of the sample square matrices corresponding to the segmentation dimensions.

TABLE 3

| Performance information of the computing resource | | | | | | | | | |
|---|---|---|---|---|---|---|---|---|---|
| Candidate segmentation dimension | 1 | 16 | 32 | 64 | 128 | 256 | 512 | 1024 | 2048 |
| Performance information (μs) | 35 | 59 | 83 | 121 | 212 | 534 | 1418 | 3738 | 9824 |

It can be learned from Table 3 that when the segmentation dimension is larger, the computing resource consumes a longer time to process a corresponding square matrix. In some embodiments, the segmentation dimension selection module 560 may determine the segmentation dimension 450 based on received performance information 545. For example, the segmentation dimension selection module 560 may compare the performance information 545 with a predetermined performance threshold, and reserve a candidate segmentation dimension whose time consumption is less than the predetermined performance threshold. For example, the performance threshold may be specified as 300 $\mu s$. Therefore, the segmentation dimension selection module 560 may determine that all the candidate segmentation dimensions 1 to 128 meet a requirement of the performance threshold. In some examples, to minimize an information loss caused by segmentation, the segmentation dimension selection module 560 may select, for example, a maximum value in the candidate segmentation dimensions that meet a threshold requirement as the segmentation dimension 450.

In some embodiments, the segmentation dimension selection module 560 may alternatively select, based on another factor (for example, the information loss discussed above), the segmentation dimension 450 from the candidate segmentation dimensions that meet the threshold requirement. For example, the segmentation dimension selection module 560 may select, as the segmentation dimension 450, a dimension whose information loss also meets a corresponding requirement from the candidate segmentation dimensions that meet the threshold requirement.

In some embodiments, to more accurately quantize the information losses and the performance information 545, the segmentation dimension selection module 560 may further normalize the information losses 535 and the performance information 545, and select the segmentation dimension 450 from the candidate segmentation dimensions 550 based on normalization results. For example, for the examples in Table 1, Table 2, and Table 3, the segmentation dimension selection module 560 may perform normalization by converting the quantities of matrices whose information losses meet the tolerable information loss in Table 1 and Table 2 into proportions, and may perform normalization by dividing each piece of performance information in Table 3 by performance information corresponding to a smallest candidate segmentation dimension. Normalization results of Table 1 to Table 3 may be represented, for example, in Table 4.

TABLE 4

Normalization of the performance information and the information losses

| Candidate segmentation dimension | Normalized data of Table 1 | Normalized data of Table 2 | Normalized data of Table 3 |
|---|---|---|---|
| 1 | 0.074074 | 1 | 1 |
| 16 | 0.074074 | 1 | 0.601374 |
| 32 | 0.092593 | 1 | 0.427578 |
| 64 | 0.166667 | 1 | 0.293913 |
| 128 | 0.240741 | 1 | 0.166927 |
| 256 | 0.425926 | 1 | 0.06641 |
| 512 | 0.592593 | 1 | 0.025 |
| 1024 | 0.851852 | 1 | 0.009486 |
| 2048 | 0.888889 | 1 | 0.00361 |

In some embodiments, the segmentation dimension selection module 560 may fit normalized performance information and normalized information losses, and a fitting function may be determined, for example, as a combination of a plurality of segments of linear functions. For example, a fitting function for fitting of the information loss of the left factor matrix may be represented as a combination of a linear function that connects a point (1, 0.074074) and a point (16, 0.074074), a linear function that connects the point 16, 0.074074) and a point (32, 0.092593), a linear function that connects the point (32, 0.092593) and a point (64, 0.166667), a linear function that connects the point (64, 0.166667) and a point (128, 0.240741), a linear function that connects the point (128, 0.240741) and a point (256, 0.425926), a linear function that connects the point (256, 0.425926) and a point (512, 0.592593), a linear function that connects the point (512, 0.592593) and a point (1024, 0.851852), and a linear function that connects the point (1024, 0.851852) and a point (2048, 0.888889). Fitting functions for the information loss and the performance information of the right factor matrix may be similarly determined.

Figure 6:
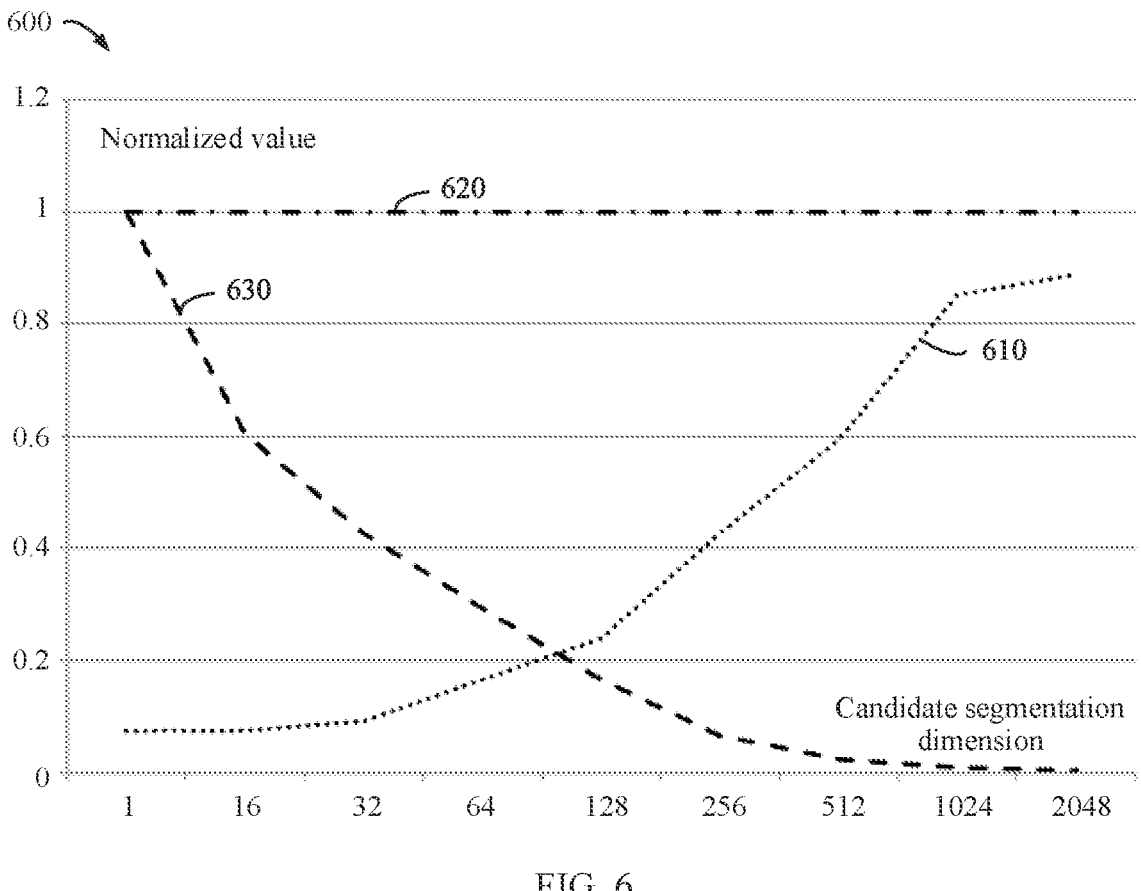
FIG. 6 is a schematic diagram of example fitting according to some embodiments of the present application.

FIG. 6 is a schematic diagram 600 of example fitting according to some embodiments of the present application. As shown in FIG. 6, a fitting function 610 represents the fitting function for the information loss of the left factor matrix, a fitting function 620 represents the fitting function for the information loss of the right factor matrix, and a fitting function 630 represents the fitting function for the performance information.

In some embodiments, the segmentation dimension selection module 560 may further determine the segmentation dimension based on an intersection point of different fitting functions. For example, the segmentation dimension selection module 560 may determine that an intersection point of the fitting function 630 for the performance information and the fitting function 620 for the information loss of the right factor matrix is a point (1, 1), and therefore the segmentation dimension selection module 560 can determine that the segmentation dimension 450 for the right factor matrix is "1".

For the example of FIG. 6, the segmentation dimension selection module 560 may further determine, for example, that an intersection point of the fitting function 630 for the performance information and the fitting function 610 for the information loss of the left factor matrix is (104.5, 0.213547). Because 104.5 is not the candidate segmentation dimension 550, the segmentation dimension selection module 560 may select a candidate segmentation dimension that is closest to a value of the horizontal coordinate of the intersection point as the segmentation dimension 450. For example, the segmentation dimension selection module 560 may select "128" as the segmentation dimension 450 for the left factor matrix. Based on such a manner, the segmentation dimension selection module 560 may implement a balance between a low information loss and high computing efficiency.

Still refer to FIG. 4. After the segmentation dimension 450 is determined, the matrix segmentation module 480 may segment the Kronecker factor matrix 245 based on the segmentation dimension 450 to obtain the plurality of square matrices 250. As shown in FIG. 2 with respect to the Kronecker factor matrix 245 and the square matrices 250, the matrix segmentation module 480 performs segmentation along the main diagonal line of the Kronecker factor matrix 245, so that the plurality of square matrices 250 correspond to the elements located on the diagonal line of the Kronecker factor matrix 245.

The following describes the process of segmenting the Kronecker factor matrix with reference to FIG. 7A to FIG.

7C. FIG. 7A is a schematic diagram 700A of segmenting the Kronecker factor matrix according to an embodiment of the present application. As shown in FIG. 7A, the Kronecker factor matrix 245 is, for example, a 12*12 square matrix 710. When the segmentation dimension 450 is determined as "4", the matrix segmentation module 480 may construct a square matrix 720-1 with a rank "4" based on the segmentation dimension by using a start element $X_0Y_0$ on a main diagonal line of the Kronecker factor matrix 710 as a start point. Elements on a main diagonal line of the square matrix 720-1 form a subset of the elements on the main diagonal line of the Kronecker factor matrix 710. Subsequently, the matrix segmentation module 480 may use the first element ($X_4Y_4$ in this example) that is on the main diagonal line of the Kronecker factor matrix 710 and that is located behind the square matrix 720-1 as a start element, and construct a square matrix 720-2 with the rank "4" along the main diagonal line of the Kronecker factor matrix 710. Based on a similar manner, the matrix segmentation module 480 may segment the Kronecker factor matrix 710 into three square matrices 720-1, 720-2, and 720-3 with the same rank "4", where the square matrices 720-1, 720-2, and 720-3 are submatrices of the Kronecker factor matrix 710. Based on such a segmentation manner, main diagonal lines of a plurality of square matrices (the square matrices 720-1, 720-2, and 720-3) are each in a one-to-one correspondence with a part of the main diagonal line of the Kronecker factor matrix 710, and elements on all the main diagonal lines of the plurality of square matrices (the square matrices 720-1, 720-2, and 720-3) include all the elements on the main diagonal line of the Kronecker factor matrix 720.

In some other embodiments, the Kronecker factor matrix cannot be completely segmented into an integral quantity of square matrices with a same rank. FIG. 7B is a schematic diagram 700B of segmenting the Kronecker factor matrix according to another embodiment of the present application. As shown in FIG. 7B, the Kronecker factor matrix 245 is, for example, a 12*12 square matrix 710. When the segmentation dimension 450 is determined as "5", the matrix segmentation module 480 first obtains two square matrices 740-1 and 740-2 with a rank "5" from the Kronecker factor matrix 730 by segmentation in a continuous segmentation manner along a main diagonal line. When it is determined that a rank of a square matrix constructed by using remaining elements on the main diagonal line as a main diagonal line is less than the segmentation dimension, the matrix segmentation module 480 may use, as one of the plurality of square matrices obtained by segmenting the Kronecker factor matrix, the square matrix constructed by using the remaining elements on the main diagonal line as the main diagonal line. For example, for the example of FIG. 7B, a square matrix 740-3 with a rank "2" is determined as one of square matrices obtained by segmenting the Kronecker factor matrix 730. Based on such a manner, the Kronecker factor matrix 730 is segmented into the square matrices 740-1 and 740-2 with the rank "5" and the square matrix 740-3 with the rank "2".

Figure 7C:
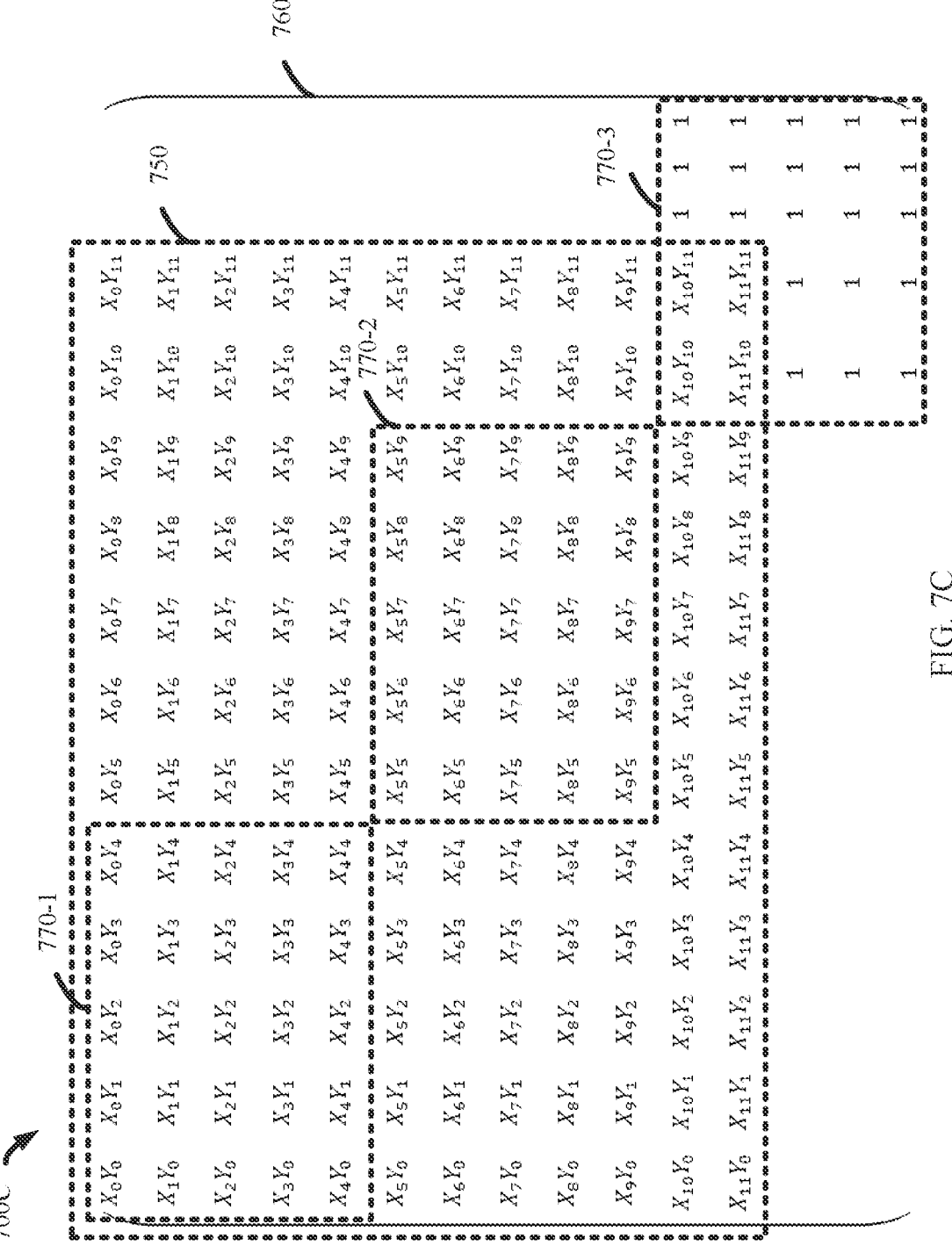

In some other embodiments, to facilitate batch processing of the square matrices 250 obtained by segmentation, the matrix segmentation module 480 may complement the square matrix that is obtained by segmentation and whose rank is less than the segmentation dimension 450 to a square matrix whose rank is equal to the segmentation dimension 450. FIG. 7C is a schematic diagram 700C of segmenting the Kronecker factor matrix according to still another embodiment of the present application. As shown in FIG. 7C, the to-be-segmented Kronecker factor matrix is a matrix 750, and the segmentation dimension 450 is "5". The matrix segmentation module 480 first obtains two square matrices 770-1 and 770-2 with a rank "5" by segmentation from the Kronecker factor matrix 750 in a continuous segmentation manner along a main diagonal line.

Compared with FIG. 7B, in the example of FIG. 7C, before the square matrices are sent to different model parameter adjustment units 330, the matrix segmentation module 480 may expand a remaining square matrix to a square matrix with the rank "5" by filling a specified value (for example, 1). In some embodiments, the matrix segmentation module 480 may determine, before segmentation, whether a rank of the to-be-segmented Kronecker factor matrix 750 can be exactly divided by the segmentation dimension 450. If it is determined that the rank of the Kronecker factor matrix 750 cannot be exactly divided by the segmentation dimension 450, the matrix segmentation module 480 may expand the Kronecker factor matrix 750 in a manner of filling a specified value.

FIG. 7C is used as an example. The matrix segmentation module 480 may determine, for example, that the rank "12" of the Kronecker factor matrix 750 cannot be exactly divided by the segmentation dimension "5". Therefore, the matrix segmentation module 480 may expand, for example, the Kronecker factor matrix 750 to an intermediate matrix 760. The intermediate matrix 760 has a rank "15" that can be exactly divided by the segmentation dimension "5". After the intermediate matrix 760 is obtained, the matrix segmentation module 480 may segment, for example, the intermediate matrix 760 into three square matrices 770-1, 770-2, and 770-3 with the rank "5" with reference to the method described in FIG. 7A.

In still another embodiment, with reference to the method described in FIG. 7B, the matrix segmentation module 480 may alternatively obtain a square matrix whose rank is less than the segmentation dimension, and then expand, in a manner of filling a specified value, the square matrix to a square matrix that has a rank equal to the segmentation dimension. With reference to the examples of FIG. 7B and FIG. 7C, the matrix segmentation module 480 may first perform, for example, segmentation to obtain a square matrix 740-3, and then expand the square matrix 740-3 to a square matrix 770-3 with the rank "5" in a manner of filling a specified value "1". Because the filled value "1" is converted into "0" in an inversion operation process, such filling does not cause an extra error to inversion operation of the Kronecker factor matrix. On the contrary, in this embodiment of the present application, the plurality of square matrices obtained by segmentation have a same rank, so that a batch processing process for the plurality of square matrices can be better supported.

Based on the foregoing discussed matrix segmentation method, the matrix segmentation module 480 can enable each of the main diagonal lines of the plurality of square matrices to be in a one-to-one correspondence with a part of the main diagonal line of the Kronecker factor matrix, and the elements on all the main diagonal lines of the plurality of square matrices include all the elements on the main diagonal line of the Kronecker factor matrix. In such a manner, the matrix segmentation module 480 enables matrix inversion operation of the Kronecker factor matrix 245 to be approximated as matrix inversion operation of the plurality of square matrices 250, thereby reducing time costs of matrix inversion operation.

In some embodiments, the matrix segmentation module 480 may further continuously store, in a memory, square matrices with a same dimension in the square matrices 250 obtained by segmentation, for use in a subsequent inverse matrix operation process. Based on such a manner, efficiency of batch processing can be improved.

It should be understood that a specific value in the foregoing discussion is merely an example, and is not intended to limit the present application.

Model Parameter Adjustment

Still refer to FIG. 3. The data processing module 235 further includes the model parameter adjustment unit 330, configured to receive the plurality of square matrices 250 output by the Kronecker factor matrix segmentation module 320, and adjust the parameter of the model 220 based on the square matrices 250.

Specifically, the model parameter adjustment unit 330 may compute the inverse matrices of the plurality of square matrices 250, and use a combination of the inverse matrices of these square matrices as an approximation of the inverse matrix of the Kronecker factor matrix 245 that is segmented to obtain these square matrices 250. Subsequently, the model parameter adjustment unit 330 may direct optimization of the model 220 in any appropriate process of adjusting the parameter based on higher-order optimization information. Details are not described herein again. In such a manner, in this embodiment of the present application, inversion operation of an original large matrix may be converted into inversion operation of a plurality of small matrices, thereby greatly reducing time complexity.

In some embodiments, the model parameter adjustment unit 330 may alternatively determine the inverse matrices of the plurality of square matrices 250 in parallel in a batch processing manner. By using the segmentation method discussed above, most of the square matrices 250 obtained by segmentation have a same dimension. This provides a basis for parallel computing of the inverse matrices of these square matrices. In this embodiment of the present application, batch processing is performed on square matrices that have a same dimension in the plurality of obtained square matrices 250, so that time overheads of inverse matrix computing can be further reduced, thereby reducing time costs required for model convergence.

It is experimentally found that the method of the present application is significantly improved in performance in comparison with a conventional higher-order optimization algorithm (for example, KFAC). For example, a time for computing the inverse matrix of the Kronecker factor matrix of the higher-order information matrix is shortened from 445 ms in the KFAC algorithm to 28 ms in the method according to the present application, and performance is improved by 16 times.

Example Data Processing System

Figure 8:
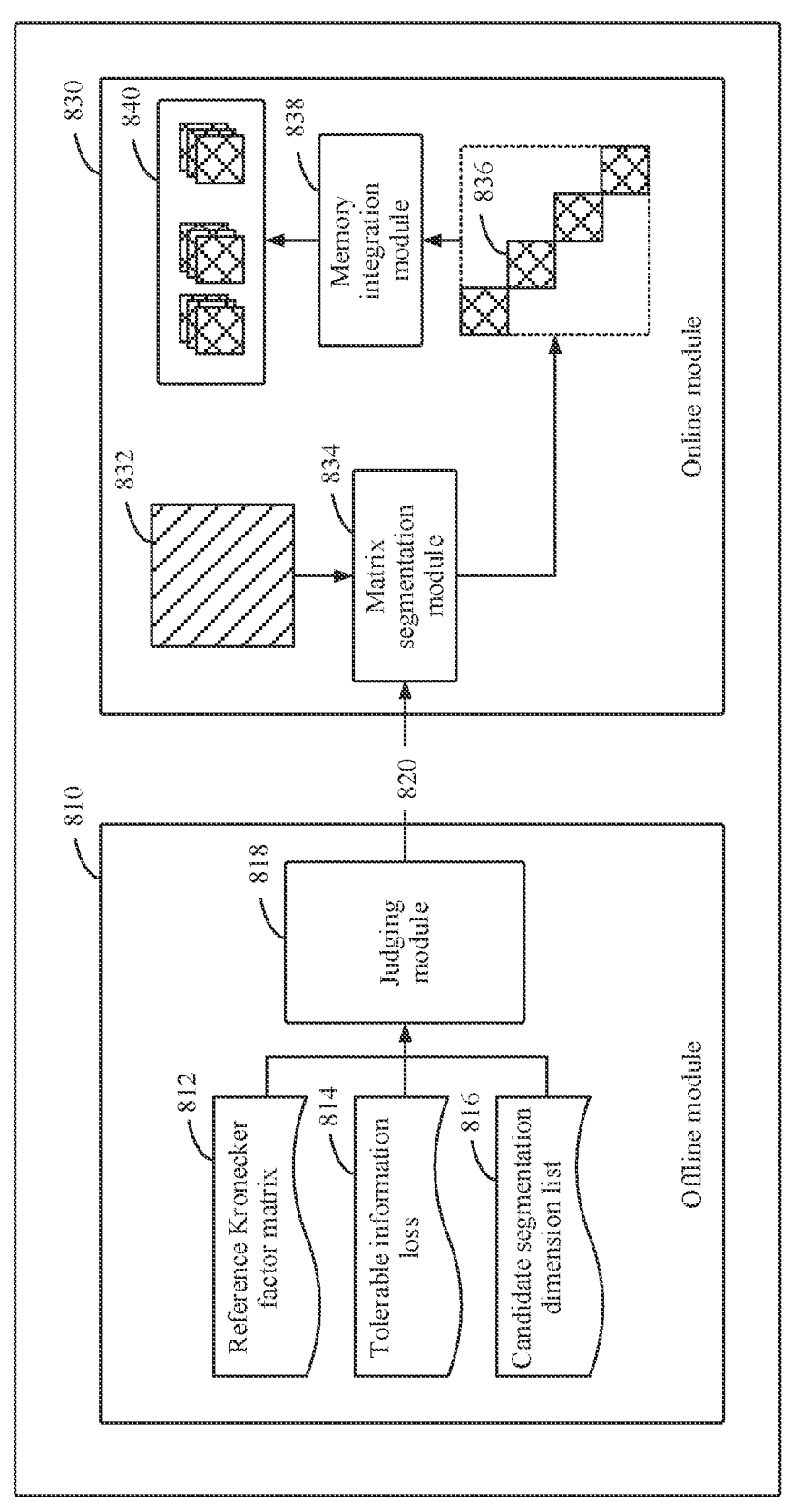
FIG. 8 shows an example data processing system according to some embodiments of the present application.

FIG. 8 shows an example data processing system 800 according to an embodiment of the present application. The example data processing system 800 may be implemented as one or more software engines, hardware components, a combination thereof, or the like, and is configured with logic for implementing a function of a corresponding module.

As shown in FIG. 8, the data processing system 800 may include an offline module 810 and an online module 830. As discussed above with reference to FIG. 4 and FIG. 5, for example, when it is determined that there is no segmentation dimension corresponding to the model identifier and the resource identifier, the data processing system 800 may start logic for the offline module 810. Specifically, the offline module 810 may include a judging module 818, configured to receive a reference Kronecker factor matrix 812, a tolerable information loss 814, and a candidate segmentation dimension list 816, and determine a segmentation dimension 820 used to segment a Kronecker factor matrix 832. In some embodiments, the tolerable information loss 814 is configured, for example, by a user. In some embodiments, the reference Kronecker factor matrix 812 may be the reference Kronecker factor matrix 520 in FIG. 5. For example, the reference Kronecker factor matrix 812 may be a Kronecker factor matrix generated after the parameter of model 220 is iterated for a predetermined quantity of times by using the training data 210.

In some embodiments, the judging module 818 may implement, for example, same logic as the segmentation dimension selection module 560 in FIG. 5. With reference to the method discussed above, the judging module 818 may determine an information loss and performance information corresponding to each candidate segmentation dimension based on the reference Kronecker factor matrix 812, the tolerable information loss 814, and the candidate segmentation dimension list 816. The judging module 818 may further determine, for example, the segmentation dimension 820 based on both information losses and performance information.

After the segmentation dimension 820 is determined, a matrix segmentation module 834 included in the online module 830 may perform matrix segmentation on the Kronecker factor matrix 832 based on the segmentation dimension 820 to obtain a plurality of square matrices 836. In some embodiments, the matrix segmentation module 834 may implement same logic as the matrix segmentation module 480 in FIG. 4. The Kronecker factor matrix 832 is segmented into the plurality of square matrices 836, so that the data processing system 800 can reduce complexity of matrix inversion operation required for model parameter adjustment.

In some embodiments, the plurality of square matrices 836 obtained by segmentation may be provided to a memory integration module 838, to store square matrices 836 with a same rank in a memory 840 in a continuous manner. Based on such a manner, efficiency of subsequent batch computing of inverse matrices of the square matrices 836 can be improved. In some embodiments, the online module 830 in the data processing system 800 may alternatively operate independently. For example, if it is determined that there is a segmentation dimension corresponding to the model identifier and the resource identifier, the matrix segmentation module 834 may not receive the segmentation dimension 820 from the offline module. On the contrary, the matrix segmentation module 834 may segment the Kronecker factor matrix 832 based on the segmentation dimension determined based on the model identifier and the resource identifier. Based on such a manner, the data processing system 800 can effectively use a historical optimization policy, thereby avoiding an additional segmentation dimension computing process.

Figure 9:
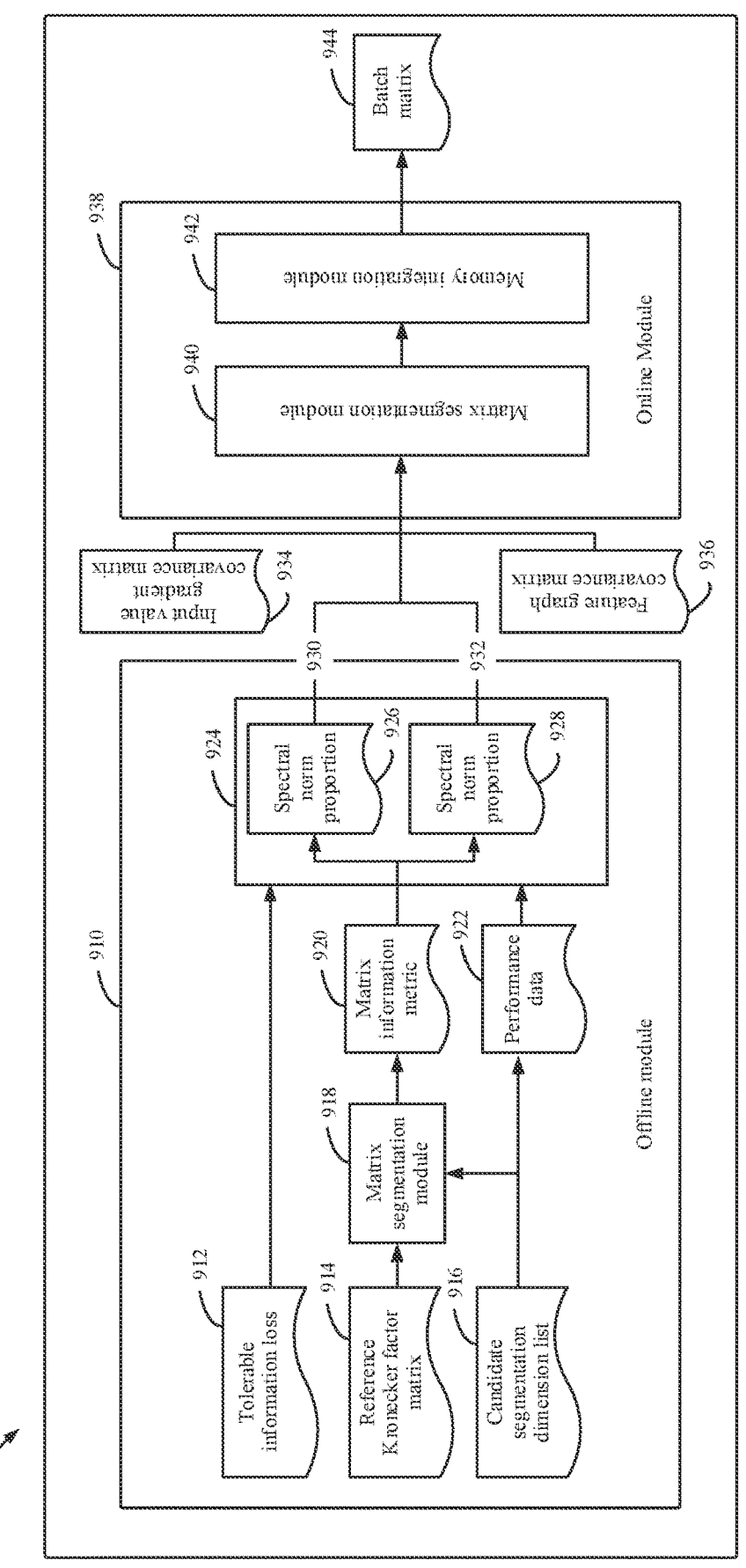
FIG. 9 shows an example data processing system according to some other embodiments of the present application.

FIG. 9 shows an example data processing system 900 according to some other embodiments of the present application. The example data processing system 900 may be implemented as one or more software engines, hardware components, a combination thereof, or the like, and is configured with logic for implementing a function of a corresponding module.

As shown in FIG. 9, the data processing system 900 includes an offline module 910 and an online module 938. As discussed above with reference to FIG. 4 and FIG. 5, for example, when it is determined that there is no segmentation dimension corresponding to the model identifier and the resource identifier, the data processing system 900 may start logic for the offline module 910. Specifically, the offline module 910 may obtain a tolerable information loss 912, a reference Kronecker factor matrix 914, and a candidate segmentation dimension list 916. In some embodiments, the tolerable information loss 912 is configured, for example, by a user. In some embodiments, the reference Kronecker factor matrix 914 may be the reference Kronecker factor matrix 520 in FIG. 5. For example, the reference Kronecker factor matrix 914 may be a Kronecker factor matrix generated after the parameter of model 220 is iterated for a predetermined quantity of times by using the training data 210.

In some embodiments, as shown in FIG. 9, the offline module 910 may include a matrix segmentation module 918, configured to segment the reference Kronecker factor matrix 914 based on a segmentation dimension in the candidate segmentation dimension list 916. Further, the matrix segmentation module 918 may further determine a matrix information metric 920 of a union matrix of a plurality of square matrices obtained by segmentation. In some embodiments, the matrix information metric 920 may be, for example, a spectral norm of a matrix.

In some embodiments, the offline module 910 may further determine, based on the candidate segmentation dimension list 916, performance data 922 corresponding to the candidate segmentation dimensions. The offline module 910 may implement, for example, same logic as the performance information computing module 540 in FIG. 5, to determine corresponding performance data.

In addition, the offline module 910 may include an evaluation module 924. The evaluation module 924 may be configured to determine a spectral norm proportion 926 for left factor matrices and a spectral norm proportion 928 for right factor matrices based on the tolerable information loss 912 and the matrix information metric 920. The evaluation module 924 may determine the spectral norm proportion 926 and the spectral norm proportion 928 with reference to the processes described above with respect to Table 1 and Table 2. The spectral norm proportion 926 may represent a quantity of left factor matrices whose information losses meet the tolerable information loss 912 after a corresponding segmentation dimension is used for segmentation. Similarly, the spectral norm proportion 928 may represent a quantity of right factor matrices whose information losses meet the tolerable information loss 912 after a corresponding segmentation dimension is used for segmentation.

Further, as shown in FIG. 9, after the spectral norm proportion 926 and the spectral norm proportion 928 are determined, the evaluation module 924 may further determine a left factor matrix segmentation dimension 930 and a right factor matrix segmentation dimension 932 based on the performance data 922. It should be understood that the evaluation module 924 may determine the left factor matrix segmentation dimension 930 and the right factor matrix segmentation dimension 932 with reference to the process described above with respect to FIG. 6.

In some embodiments, the data processing system 900 further includes the online module 938. As shown in FIG. 9, a matrix segmentation module 940 in the online module 938 may receive the left factor matrix segmentation dimension 930 and the right factor matrix segmentation dimension 932 that are determined by the evaluation module 924. In addition, the matrix segmentation module 940 may further receive an input value gradient covariance matrix 934 (corresponding to the left factor matrix) and a feature graph covariance matrix 936 (corresponding to the right factor matrix) that are generated in a model training process. The matrix segmentation module 940 may segment the input value gradient covariance matrix 934 and the feature graph covariance matrix 936 based on the left factor matrix segmentation dimension 930 and the right factor matrix segmentation dimension 932, respectively. It should be understood that the matrix segmentation module 940 may segment the input value gradient covariance matrix 934 and the feature graph covariance matrix 936 with reference to the segmentation processes described with respect to FIG. 7A to FIG. 7C.

Subsequently, a plurality of square matrices obtained by segmentation by the matrix segmentation module 940 may be provided to a memory integration module 942. The memory integration module 942 may store square matrices with a same rank in the plurality of square matrices in a continuous manner, to form a batch matrix 944. Based on such a manner, efficiency of subsequent batch computing of inverse matrices of the square matrices can be improved.

Based on such a manner, the data processing system 900 can use the offline module 910 to determine corresponding segmentation dimensions for the left factor matrix and the right factor matrix, and perform corresponding segmentation by using the online module 938, thereby reducing complexity of matrix inversion operation required for model parameter adjustment. In addition, a performance factor and an information loss factor are comprehensively considered when the offline module 910 determines the left factor matrix segmentation dimension 930 and the right factor matrix segmentation dimension 932. This can enable matrix segmentation performed by the online module 938 to meet both a predetermined performance requirement and an information loss requirement.

Example Process and Example Apparatus

Figure 10:
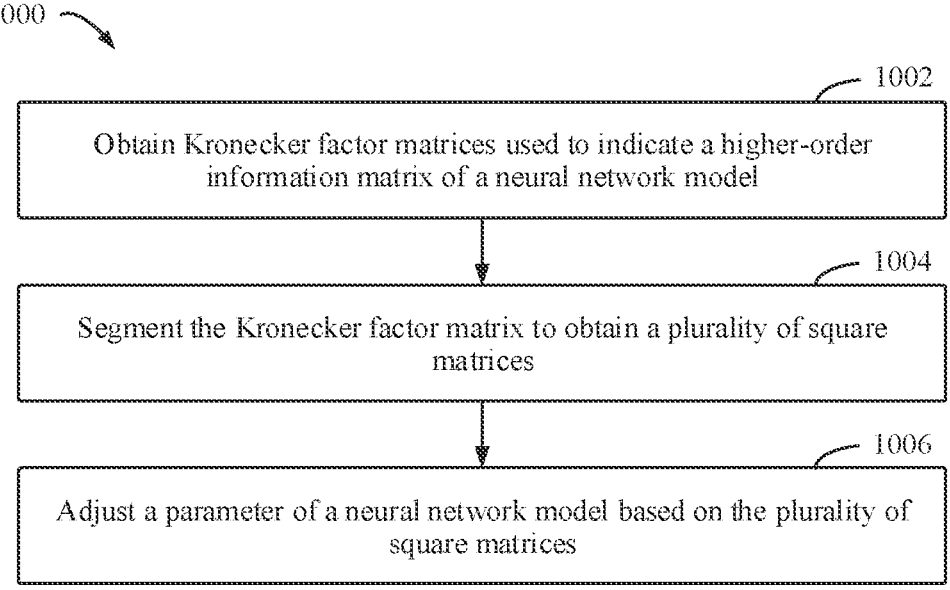
FIG. 10 is a flowchart of a data processing process according to some embodiments of the present application.

FIG. 10 is a flowchart of an example data processing process 1000 according to an embodiment of the present application. The process 1000 may be implemented, for example, by the data processing device 230 in FIG. 2. For ease of description, the following describes the process 1000 with reference to FIG. 2.

In a block 1002, the data processing device 230 obtains the Kronecker factor matrices 245 that are used to indicate the higher-order information matrix 240 of the neural network model 220, where the higher-order information matrix 240 is used to correct the first-order gradient of the neural network model 220. In a block 1004, the data processing device 230 segments the Kronecker factor matrix 245 to obtain the plurality of square matrices 250, where the plurality of square matrices 250 are submatrices of the Kronecker factor matrix, the main diagonal lines of the plurality of square matrices 250 each are in a one-to-one correspondence with a part of the main diagonal line of the Kronecker factor matrix 245, and the elements on all the main diagonal lines of the plurality of square matrices 250 include all the elements on the main diagonal line of the Kronecker factor matrix 245. In a block 1006, the data processing device 230 adjusts the parameter of the neural network model based on the plurality of square matrices 250.

Figure 11:
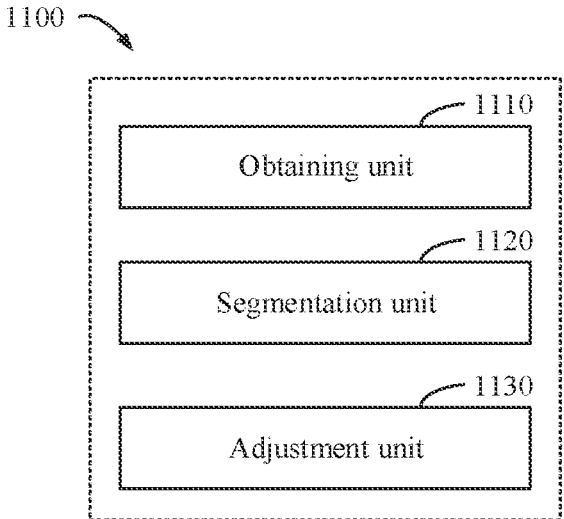
FIG. 11 is a schematic block diagram of a data processing apparatus according to an embodiment of this application.

Further, FIG. 11 is a block diagram of a data processing apparatus 1100 according to an embodiment of the present application. The data processing apparatus 1100 may include a plurality of units, configured to perform corresponding steps in the process 1000 discussed in FIG. 10. As shown in FIG. 11, the data processing apparatus 1100 includes an obtaining unit 1110, configured to obtain Kronecker factor matrices that are used to indicate a higher-order information matrix of a neural network model, where the higher-order information matrix is used to correct a first-order gradient of the neural network model. The data processing apparatus 1100 further includes a segmentation unit 1120, configured to segment the Kronecker factor matrix to obtain a plurality of square matrices, so that the plurality of square matrices are submatrices of the Kronecker factor matrix, and main diagonal lines of the plurality of square matrices each are in a one-to-one correspondence with a part of a main diagonal line of the Kronecker factor matrix. In addition, the data processing apparatus 1100 further includes an adjustment unit 1130, configured to adjust a parameter of the neural network model based on the plurality of square matrices.

In some embodiments, the segmentation unit 1120 is further configured to segment the Kronecker factor matrix based on a resource identifier of a computing resource and a model identifier of the neural network model.

In some embodiments, the data processing device stores a correspondence among the resource identifier, the model identifier, and a dimension, and the dimension indicates a rank of at least one of the plurality of square matrices obtained by segmenting the Kronecker factor matrix.

In some embodiments, the segmentation unit 1120 is further configured to select a target dimension from a plurality of dimensions based on performance information corresponding to the plurality of dimensions to segment the Kronecker factor matrix, where performance information corresponding to one dimension indicates efficiency of the computing resource in processing a square matrix corresponding to the dimension, and the target dimension indicates a rank of at least one of the plurality of square matrices obtained by segmenting the Kronecker factor matrix.

In some embodiments, a value of the performance information corresponding to one dimension is related to a time required for computing, by the data processing device, an inverse matrix of the square matrix corresponding to the dimension.

In some embodiments, the segmentation unit 1120 is further configured to select a target dimension from a plurality of dimensions based on information losses corresponding to the plurality of dimensions to segment the Kronecker factor matrix, where an information loss corresponding to one dimension indicates an information loss caused by using the dimension to segment a reference Kronecker factor matrix, and the target dimension indicates a rank of at least one of the plurality of square matrices obtained by segmenting the Kronecker factor matrix.

In some embodiments, the information loss corresponding to one dimension is a difference between a spectral norm of the reference Kronecker factor matrix and a spectral norm of a union matrix of a plurality of square matrices obtained by segmenting the reference Kronecker factor matrix by using the dimension.

In some embodiments, the segmentation unit is further configured to select a target dimension from a plurality of dimensions based on performance information corresponding to the plurality of dimensions and information losses corresponding to the plurality of dimensions, to segment the Kronecker factor matrix, where performance information corresponding to one dimension indicates efficiency of the computing resource in processing a square matrix corresponding to the dimension, an information loss corresponding to one dimension indicates an information loss caused by using the dimension to segment a reference Kronecker factor matrix, and the target dimension indicates a rank of at least one of the plurality of square matrices obtained by segmenting the Kronecker factor matrix.

In some embodiments, the adjustment unit 1130 is configured to: process the plurality of square matrices in parallel first, to determine a plurality of inverse matrices of the plurality of square matrices; and adjust the parameter of the neural network model based on a combination of the plurality of inverse matrices of the plurality of square matrices.

In some embodiments, the neural network model is an image processing model. The obtaining unit 1110 is configured to: obtain image training data; and apply the image training data to the image processing model to obtain the Kronecker factor matrix.

In some embodiments, the neural network model is a text processing model. The obtaining unit 1110 is configured to: obtain text training data; and apply the text training data to the text processing model to obtain the Kronecker factor matrix.

Example Device

Figure 12:
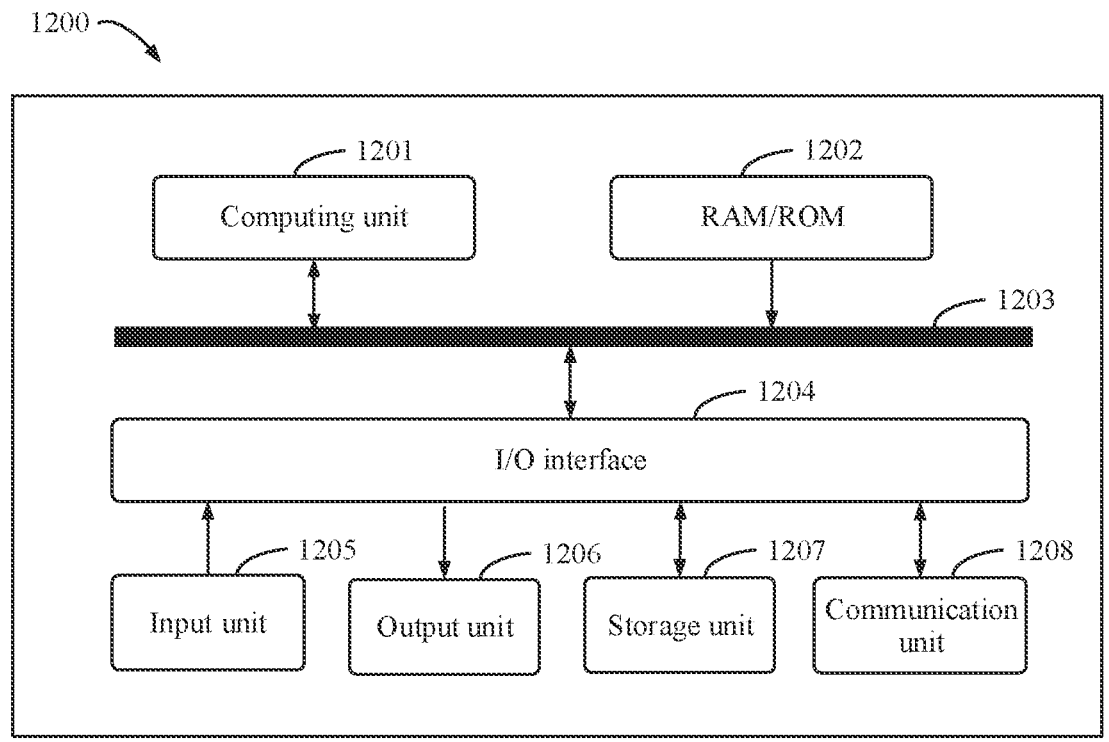
FIG. 12 is a block diagram of a computing device that can implement a plurality of embodiments of the present application.

FIG. 12 is a schematic block diagram of an example device 1200 that can be used to implement an embodiment of the present application. The device 1200 may be configured to implement the data processing device 230. As shown in the figure, the device 1200 includes a computing unit 1201. The computing unit 1201 may perform various appropriate actions and processing based on computer program instructions stored in a random access memory (RAM) and/or read-only memory (ROM) 1202 or computer program instructions loaded from a storage unit 1207 into the RAM and/or ROM 1202. The RAM and/or ROM 1202 may further store various programs and data required for an operation of the device 1200. The computing unit 1201 and the RAM and/or ROM 1202 are connected to each other by using a bus 1203. An input/output (I/O) interface 1204 is also connected to the bus 1203.

A plurality of components in the device 1200 are connected to the I/O interface 1204, and include: an input unit 1205, for example, a keyboard or a mouse; an output unit 1206, for example, any type of display or speaker; the storage unit 1207, for example, a magnetic disk or an optical disc; and a communication unit 1208, for example, a network interface card, a modem, or a wireless communication transceiver. The communication unit 1208 enables the device 1200 to exchange information/data with another device by using a computer network, for example, the Internet, and/or various telecommunication networks.

The computing unit 1201 may be any general-purpose and/or dedicated processing component with processing and computing capabilities. Some examples of the computing unit 1201 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, and microcontroller. The computing unit 1201 performs the methods and processing described above, for example, the process 1000. For example, in some embodiments, the process 1000 may be implemented as a computer software program. The computer software program is tangibly included in a machine-readable medium, for example, the storage unit 1207. In some embodiments, the computer program may be partially or completely loaded and/or installed onto the device 1200 by using the RAM and/or ROM and/or the communication unit 1208. When the computer program is loaded into the RAM and/or ROM and executed by the computing unit 1201, one or more steps of the process 1000 described above may be performed. Alternatively, in another embodiment, the computing unit 1201 may be configured to perform the process 1000 in any other appropriate manner (for example, by using firmware).

Program code used to implement the method of the present application may be written in any combination of one or more programming languages. The program code may be provided to a processor or a controller of a general-purpose computer, a dedicated computer, or another programmable data processing apparatus, so that when the program code is executed by the processor or controller, the functions/operations specified in the flowchart and/or the block diagram are implemented. The program code may be completely executed on a machine, partially executed on a machine, partially executed on a machine as a stand-alone software package and partially executed on a remote machine, or completely executed on a remote machine or server.

In the context of the present application, the machine-readable medium may be a tangible medium, and may include or store a program for use by or in combination with an instruction execution system, an apparatus, or a device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any appropriate combination of the foregoing content. A more specific example of the machine-readable storage medium includes an electrical connection based on one or more lines, a portable computer disk, a hard disk, a random access memory (RAM), a read-only memory (ROM), an erasable programmable read-only memory (EPROM or flash memory), an optical fiber, a compact disc read-only memory (CD-ROM), an optical storage device, a magnetic storage device, or any appropriate combination of the foregoing content.

In addition, although operations are described in a particular order, it should be understood as that it is required that the operations are performed in the shown particular order or in sequence, or it is required that all operations shown in the figures should be performed to achieve an expected result. In a specific environment, multi-task and parallel processing may be advantageous. Similarly, although several specific implementation details are included in the foregoing description, these should not be construed as limiting the scope of the present application. Some features described in the context of an individual embodiment may alternatively be implemented in combination in a single implementation. On the contrary, various features described in the context of a single implementation may alternatively be implemented in a plurality of implementations individually or in any appropriate sub-combination.

Although the subject matter is described in a language specific to structural features and/or method logic actions, it should be understood that the subject matter defined in the appended claims is not necessarily limited to the particular features or actions described above. On the contrary, the particular features and actions described above are merely example forms for implementing the claims.

What is claimed is:

1. A parameter optimization method, wherein the parameter optimization method is applied to a data processing device, and the parameter optimization method comprises:
obtaining a Kronecker factor matrix of a higher-order information matrix of a neural network model, wherein the higher-order information matrix corrects a first-order gradient of the neural network model, and wherein the Kronecker factor matrix is one of a pair of Kronecker factor matrices that indicate the higher-order information matrix;
segmenting the Kronecker factor matrix to obtain a plurality of square matrices, wherein the plurality of square matrices are submatrices of the Kronecker factor matrix, and main diagonal lines of the plurality of square matrices each are in a one-to-one correspondence with a part of a main diagonal line of the Kronecker factor matrix; and
adjusting a parameter of the neural network model based on the plurality of square matrices.

2. The parameter optimization method according to claim 1, wherein:
the data processing device comprises a computing resource for adjusting the parameter of the neural network model; and
the segmenting the Kronecker factor matrix comprises:
segmenting the Kronecker factor matrix based on a resource identifier of the computing resource and a model identifier of the neural network model.

3. The parameter optimization method according to claim 2, wherein the data processing device stores a correspondence among the resource identifier, the model identifier, and a dimension, and the dimension indicates a rank of at least one of the plurality of square matrices obtained by segmenting the Kronecker factor matrix.

4. The parameter optimization method according to claim 1, wherein:
the data processing device comprises a computing resource for adjusting the parameter of the neural network model, and
the segmenting the Kronecker factor matrix comprises:
selecting a target dimension from a plurality of dimensions based on performance information corresponding to the plurality of dimensions to segment the Kronecker factor matrix, wherein performance information corresponding to one dimension indicates efficiency of the computing resource in processing a square matrix corresponding to the dimension, and the target dimension indicates a rank of at least one of the plurality of square matrices obtained by segmenting the Kronecker factor matrix.

5. The parameter optimization method according to claim 4, wherein a value of the performance information corresponding to the dimension is related to a time required for computing, by the data processing device, an inverse matrix of the square matrix corresponding to the dimension.

6. The parameter optimization method according to claim 1, wherein the segmenting the Kronecker factor matrix comprises:
selecting a target dimension from a plurality of dimensions based on information losses corresponding to the plurality of dimensions to segment the Kronecker factor matrix, wherein an information loss corresponding to one dimension indicates an information loss caused by using the dimension to segment a reference Kronecker factor matrix, and the target dimension indicates a rank of at least one of the plurality of square matrices obtained by segmenting the Kronecker factor matrix.

7. The parameter optimization method according to claim 6, wherein the information loss corresponding to the dimension is a difference between a spectral norm of the reference Kronecker factor matrix and a spectral norm of a union matrix of a plurality of square matrices obtained by segmenting the reference Kronecker factor matrix by using the dimension.

8. The parameter optimization method according to claim 1, wherein the data processing device comprises a computing resource for adjusting the parameter of the neural network model, and the segmenting the Kronecker factor matrix comprises:

selecting a target dimension from a plurality of dimensions, based on performance information corresponding to the plurality of dimensions and information losses corresponding to the plurality of dimensions, to segment the Kronecker factor matrix, wherein:

performance information corresponding to one dimension indicates efficiency of the computing resource in processing a square matrix corresponding to the dimension;

an information loss corresponding to one dimension indicates an information loss caused by using the dimension to segment a reference Kronecker factor matrix; and the target dimension indicates a rank of at least one of the plurality of square matrices obtained by segmenting the Kronecker factor matrix.

9. The parameter optimization method according to claim 1, wherein the adjusting a parameter of the neural network model comprises:

processing the plurality of square matrices in parallel to determine a plurality of inverse matrices of the plurality of square matrices; and adjusting the parameter of the neural network model based on a combination of the plurality of inverse matrices of the plurality of square matrices.

10. The parameter optimization method according to claim 1, wherein:

the neural network model is an image processing model; and the obtaining a Kronecker factor matrix comprises:

obtaining image training data; and applying the image training data to the image processing model to obtain the Kronecker factor matrix.

11. The parameter optimization method according to claim 1, wherein:

the neural network model is a text processing model; and obtaining the Kronecker factor matrix comprises:

obtaining text training data; and applying the text training data to the text processing model to obtain the Kronecker factor matrix.

12. A non-transitory computer-readable storage medium storing computer instructions for execution by at least one processor to:

obtain a Kronecker factor matrix of a higher-order information matrix of a neural network model, wherein the higher-order information matrix corrects a first-order gradient of the neural network model, and wherein the Kronecker factor matrix is one of a pair of Kronecker factor matrices that indicate the higher-order information matrix;

segment the Kronecker factor matrix to obtain a plurality of square matrices, wherein the plurality of square matrices are submatrices of the Kronecker factor matrix, and main diagonal lines of the plurality of square matrices each are in a one-to-one correspondence with a part of a main diagonal line of the Kronecker factor matrix; and adjust a parameter of the neural network model based on the plurality of square matrices.

13. The non-transitory computer-readable storage medium according to claim 12, wherein the non-transitory computer-readable storage medium stores the computer instructions for execution by the at least one processor to:

segment the Kronecker factor matrix based on a resource identifier of a computing resource and a model identifier of the neural network model.

14. The non-transitory computer-readable storage medium according to claim 13, wherein the non-transitory computer-readable storage medium stores a correspondence among the resource identifier, the model identifier, and a dimension, and the dimension indicates a rank of at least one of the plurality of square matrices obtained by segmenting the Kronecker factor matrix.

15. The non-transitory computer-readable storage medium according to claim 13, wherein the non-transitory computer-readable storage medium stores the computer instructions for execution by the at least one processor to:

select a target dimension from a plurality of dimensions based on performance information corresponding to the plurality of dimensions to segment the Kronecker factor matrix, wherein performance information corresponding to one dimension indicates efficiency of the computing resource in processing a square matrix corresponding to the dimension, and the target dimension indicates a rank of at least one of the plurality of square matrices obtained by segmenting the Kronecker factor matrix.

16. A parameter optimization apparatus, comprising:

at least one processor; and one or more memories coupled to the at least one processor and storing programming instructions for execution by the at least one processor to:

obtain a Kronecker factor matrix of a higher-order information matrix of a neural network model, wherein the higher-order information matrix corrects a first-order gradient of the neural network model, and wherein the Kronecker factor matrix is one of a pair of Kronecker factor matrices that indicate the higher-order information matrix;

segment the Kronecker factor matrix to obtain a plurality of square matrices, wherein the plurality of square matrices are submatrices of the Kronecker factor matrix, and main diagonal lines of the plurality of square matrices each are in a one-to-one correspondence with a part of a main diagonal line of the Kronecker factor matrix; and adjust a parameter of the neural network model based on the plurality of square matrices.

17. The parameter optimization apparatus according to claim 16, wherein the parameter optimization apparatus comprises a computing resource for adjusting the parameter of the neural network model, and wherein the one or more memories store the programming instructions for execution by the at least one processor to:

segment the Kronecker factor matrix based on a resource identifier of the computing resource and a model identifier of the neural network model.

18. The parameter optimization apparatus according to claim 17, wherein the parameter optimization apparatus stores a correspondence among the resource identifier, the model identifier, and a dimension, and the dimension indicates a rank of at least one of the plurality of square matrices obtained by segmenting the Kronecker factor matrix.

19. The parameter optimization apparatus according to claim 16, wherein the parameter optimization apparatus comprises a computing resource for adjusting the parameter of the neural network model, and wherein the one or more memories store the programming instructions for execution by the at least one processor to:

select a target dimension from a plurality of dimensions based on performance information corresponding to the plurality of dimensions to segment the Kronecker factor matrix, wherein performance information corresponding to one dimension indicates efficiency of the computing resource in processing a square matrix corresponding to the dimension, and the target dimension indicates a rank of at least one of the plurality of square matrices obtained by segmenting the Kronecker factor matrix.

20. The parameter optimization apparatus according to claim 19, wherein a value of the performance information corresponding to the dimension is related to a time required for computing, by the parameter optimization apparatus, an inverse matrix of the square matrix corresponding to the dimension.

* * * * *